(12) United States Patent
Horsfall et al.

(10) Patent No.: US 11,065,697 B2
(45) Date of Patent: Jul. 20, 2021

(54) KEY CUTTING APPARATUS

(71) Applicant: ICONX LTD, Silsden (GB)

(72) Inventors: David Anthony Horsfall, Silsden (GB); Polly Crowther, Silsden (GB)

(73) Assignee: ICONX LTD, Silsden (GB)

( * ) Notice: Subject to any disclaimer, the term of this patent is extended or adjusted under 35 U.S.C. 154(b) by 0 days.

(21) Appl. No.: 16/567,912

(22) Filed: Sep. 11, 2019

(65) Prior Publication Data
US 2021/0069803 A1 Mar. 11, 2021

(51) Int. Cl.
*B23C 3/35* (2006.01)
*B23Q 35/128* (2006.01)

(52) U.S. Cl.
CPC .............. *B23C 3/35* (2013.01); *B23Q 35/128* (2013.01)

(58) Field of Classification Search
CPC ....... B23C 3/35; B23C 3/355; B23C 2235/00; B23C 2235/12; B23C 2235/28; B23C 2235/41; Y10T 409/300952; Y10T 409/301008; Y10T 409/301064
See application file for complete search history.

(56) References Cited

U.S. PATENT DOCUMENTS

| | | |
|---|---|---|
| 2,582,012 A | 1/1952 | Currier |
| 3,323,420 A | 6/1967 | Roxburgh |
| 3,413,892 A | 12/1968 | Casey et al. |
| 3,442,174 A | 5/1969 | Weiner et al. |
| 3,796,130 A | 3/1974 | Gartner |
| 6,065,911 A * | 5/2000 | Almblad ............ G05B 19/4207 409/83 |
| 8,532,809 B2 * | 9/2013 | Freeman ............... G07F 11/70 700/117 |
| 9,468,982 B1 | 10/2016 | Mueller et al. |
| 2009/0228795 A1 * | 9/2009 | Bass .................. G06Q 10/087 715/705 |
| 2011/0297691 A1 | 12/2011 | Freeman |
| 2011/0301738 A1 | 12/2011 | Freeman |
| 2013/0138243 A1 | 5/2013 | Freeman |
| 2013/0170693 A1 | 7/2013 | Marsh et al. |
| 2014/0377027 A1 | 12/2014 | Burkett et al. |

(Continued)

FOREIGN PATENT DOCUMENTS

| | | |
|---|---|---|
| EP | 0 492 372 A2 | 7/1992 |
| EP | 3 412 389 A1 | 12/2018 |

(Continued)

OTHER PUBLICATIONS

Extended European Search Report for EP Application No. 20190062.8 dated Feb. 22, 2021 (6 pages).

*Primary Examiner* — Nicole N Ramos
(74) *Attorney, Agent, or Firm* — Alston & Bird LLP

(57) ABSTRACT

Key cutting apparatus for cutting a new key to replicate an existing key. The apparatus comprising a reader determining the type of key blank to be cut and the required shape for the blank to be cut to. A plurality of magazines for retaining a supply of a number of different types of key blanks are provided. A key cutter is provided for cutting a new key from a blank in response to the measured shape of the existing key. A key carrying arrangement is provided to fetch a required key blank from a respective magazine and take the required key blank to the key cutter.

23 Claims, 33 Drawing Sheets

(56) References Cited

U.S. PATENT DOCUMENTS

| | | | |
|---|---|---|---|
| 2015/0050094 A1* | 2/2015 | Gerlings | G07F 17/0014 409/81 |
| 2017/0225242 A1* | 8/2017 | Spangler | G06Q 20/18 |
| 2018/0079014 A1 | 3/2018 | Marsh | |
| 2018/0264561 A1* | 9/2018 | Schmidt | B23C 3/355 |

FOREIGN PATENT DOCUMENTS

| | | |
|---|---|---|
| EP | 3 412 405 A1 | 12/2018 |
| EP | 3 412 406 A1 | 12/2018 |
| EP | 3 466 577 A1 | 4/2019 |
| GB | 952978 A | 3/1964 |
| GB | 2 293 341 A | 3/1996 |
| GB | 2563224 A | 12/2018 |
| GB | 2564556 A | 1/2019 |
| GB | 2564557 A | 1/2019 |
| GB | 2567194 A | 4/2019 |
| WO | WO 99/55482 A1 | 11/1999 |
| WO | WO 2008/066857 A2 | 6/2008 |
| WO | WO 2011/153473 A2 | 12/2011 |
| WO | WO 2012/170321 A2 | 12/2012 |
| WO | WO 2013/103774 A1 | 7/2013 |

* cited by examiner

KEY CUTTING APPARATUS

This invention concerns a key cutting apparatus.

A number of key cutting machines are currently available. There are a significant number of different types of key blanks, whether for cylinder or lever keys. In view of this it has generally only been possible to provide semi-automatic key cutting machines, where it is usually required to manually input the identity of, or the actual required blank to be cut.

According to a first aspect of the disclosure there is provided key cutting apparatus for cutting a new key to replicate an existing key, the apparatus comprising: an optical reader to read the shape of the existing key, the reader determining the type of key blank to be cut and the required shape for the blank to be cut to; a blank storage arrangement for retaining a supply of a number of different types of key blanks, the blank storage arrangement including: a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with the head of a key blank and two arms engageable with sides of a shank of the key blank; the key cutting apparatus further comprising a key cutter configured to cut a new key from a blank ejected by and obtained from the dispenser in accordance with the determined required shape of the existing key.

The key cutting apparatus may further comprise a key carrying arrangement, the key carrying arrangement being configured to fetch a required key blank from the blank storage arrangement, and take the required key blank to the key cutter.

The dispensers may be configured to automatically eject a key blank upon the key carrying arrangement arriving at the respective magazine.

The dispenser may include a linkage with an actuator for engagement by the key carrying arrangement, which actuator when engaged by the key carrying arrangement for the single key blank causes the ejector to move to eject the key blank.

The arms of the ejector may be configured to engage against the sides of the shank of the key blank at a point spaced from a head or ear of the key blank, when the head of the key blank is in contact with the face of the ejector, to provide a forward space for the head of the key blank.

The key blanks may be stacked vertically one above another in substantially identical alignment, and the single key blank may be the lowermost key blank. The dispenser may include a surface configured to support the lowermost key blank and the ejector.

The ejector may be slidably movable through the slot up to a forward ejected position where the whole of the face engageable with the head of a key blank does not move beyond the edge of the support surface, such that at least a part of the head of the key blank received in the ejector being moved by the ejector is supported the support surface in the ejected position, and the key carrying arrangement may be positionable to receive the end of the shank of an ejected key, such that at least a part of the shank of an ejected key is supported by the key carrying arrangement in the ejected position.

The key carrying arrangement may be configured to clamp onto the key in the ejected position.

The key carrying arrangement may be configured to pull the clamped key laterally away from the face engageable with the head of the key blank such that the key blank is clear of the support surface, and then lower the key blank such that it is clear of the arms of the ejector. The face of the ejector may be concave.

The dispenser may be spring urged to a position where the ejector is not ejecting a key blank from the magazine.

The magazines may have an internal profile to engage with the head and shank of a key blank to provide a correct alignment thereof.

The internal profile of the magazine may be adjustable to receive different sizes and shapes of key blanks.

The apparatus may include an inlet for receiving an existing key to have the shape of the key read by the reader.

The apparatus may include an outlet to deliver a new key to a customer, and the key carrying arrangement may deliver the cut key from the key cutter to the outlet.

The blank storage arrangement may include a plurality of magazines, with a respective magazine for each type of key blank.

The magazines may locate the key blanks in a stack one above another other. At least ten magazines may be provided, and preferably at least twenty five magazines may be provided.

A dispenser may be provided for each magazine to dispense key blanks therefrom, one at a time.

The dispenser may be configured to automatically dispense a key blank upon the key carrying arrangement arriving at a respective magazine. The dispenser may include a projecting actuator arranged such that as the key carrying arrangement approaches a respective magazine the key carrying arrangement engages against the actuator to cause a key blank to be dispensed to the key carrying arrangement.

The key carrying arrangement may hold the blade of a dispensed key blank and deliver the key blank to the cutting apparatus such that the key blank is held in the cutting apparatus by the head of the key blank.

The key carrying arrangement may include a key clamp assembly, the assembly including first and second clamp plates selectively movable together or apart to selectively clamp a key blank therebetween. The assembly may also include a lever key clamping arrangement and a cylinder key clamping arrangement for selectively respectively either clamping a lever key blank or a cylinder key blank in a required position on the assembly.

The required positions for respectively clamping either a lever key blank or a cylinder key blank may be different from each other.

The lever key blank clamping arrangement and a cylinder key clamping arrangement may be located adjacent each other.

The lever key clamping arrangement may include an elongate indent in the first clamp plate to receive part of the shank of a lever key blank, a first grip on the second clamp plate engageable against the shank of a lever key blank to urge it into the elongate indent, and a second grip on the second clamp plate engageable against the blade of a lever key blank to urge the blade flat against the first clamp plate adjacent the elongate indent.

A first surface may be provided on the second clamp plate adjacent the elongate indent on the opposite side to the second grip, against which the side of the shank of a lever key blank opposite the blade may abut when the shank is received in the elongate indent.

A second surface may be provided on the first clamp plate spaced from a front edge of the first clamp plate, against which second surface; a distal end of a lever key blank shaft abuts, when the blank is in a required location on the first clamp plate.

The first grip may be resilient. The second grip may be resilient. The first grip may be softer than the second grip. The first and second grips may be made of a foamed material.

The elongate indent may have a V shape profile, and may have a shallow V shape profile.

The front edge of the first clamp plate may be chamfered to help guide a lever key blank into a required position.

The cylinder key clamping arrangement may include a third surface on the first clamp plate against which the side of a cylinder key blank abuts when located in a required position on the first clamp plate, and may include a resilient member located on the first clamp plate spaced from the third surface configured to urge a cylinder key blank against the third surface.

The cylinder key clamping arrangement may include a fourth surface spaced from the front edge of the first clamp plate, against which fourth surface a distal end of a cylinder key blank abuts when the blank is located on the first clamp plate in a required position.

The fourth surface may be inclined away from the front edge of the first clamp plate and towards the third surface, to urge an inclined end of a cylinder key blank against the third surface.

The resilient member may be in the form of a profiled sprung member, which sprung member may be inclined outwardly towards the front edge of the first clamp plate to help guide a cylinder key blank into a required position.

A guide may be provided spaced from the first clamp plate and adjacent the fourth surface, to prevent a cylinder key blank located in position on the first clamp plate from rotating relative to the first clamp plate.

A third grip may be provided on the second clamp plate engageable against a cylinder key blank when located in position on the first clamp plate, to urge the cylinder key blank against the first clamp plate.

The third grip may be resilient, and the third grip may be made of a foamed material.

The first and third surfaces may be provided on opposite sides of a common projection.

The second clamp plate may be located in use above the first clamp plate, and the first clamp plate may extend horizontally.

A holding arrangement to selectively hold a key blank subsequent to cutting may be provided on the key clamp arrangement, and may be provided on the first clamp plate, and may extend laterally therefrom.

According to a further aspect of the disclosure there is provided a key cutting apparatus for cutting a new key to replicate an existing key, the apparatus comprising an optical reader to read the shape of the existing key, the reader determining the type of key blank to be cut and the required shape for the blank to be cut to, a blank storage arrangement for retaining a supply of a number of different types of key blanks, a key cutter for cutting a new key from a blank in response to the measured shape of the existing key, and a carrying arrangement, the carrying arrangement being configured to fetch a required key blank from the blank storage arrangement, and take the required key blank to the key cutting station.

According to yet further aspect of the disclosure there is provided a key cutting apparatus for cutting a new key to replicate an existing key, the apparatus comprising: reading means for reading the shape of the existing key, the reading means determining the type of key blank to be cut and the required shape for the blank to be cut to; blank storage means for retaining a supply of a number of different types of key blanks, the blank storage means including: a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensing means for the plurality of magazines configured to eject key blanks from the magazines, at least one of the plurality of dispensing means including ejecting means which is slidably movable in the slot to engage with and move the single key blank, wherein the ejecting means includes a face engageable with the head of a key blank and two arms engageable with sides of a shank of the key blank; the key cutting apparatus further comprising: key cutting means configured to cut a new key from a blank ejected by and obtained from the dispensing means in accordance with the determined required shape of the existing key; and carrying means, the carrying means being configured to fetch a required key blank from the blank storage means, and take the required key blank to the key cutting means.

Embodiments of the present disclosure will now be described by way of example only and with reference to the accompanying drawings, in which:—

The drawings show a key cutting apparatus 10 for cutting a new key to replicate an existing key so as to provide a duplicate copy or copies of an existing key.

Figure 1:
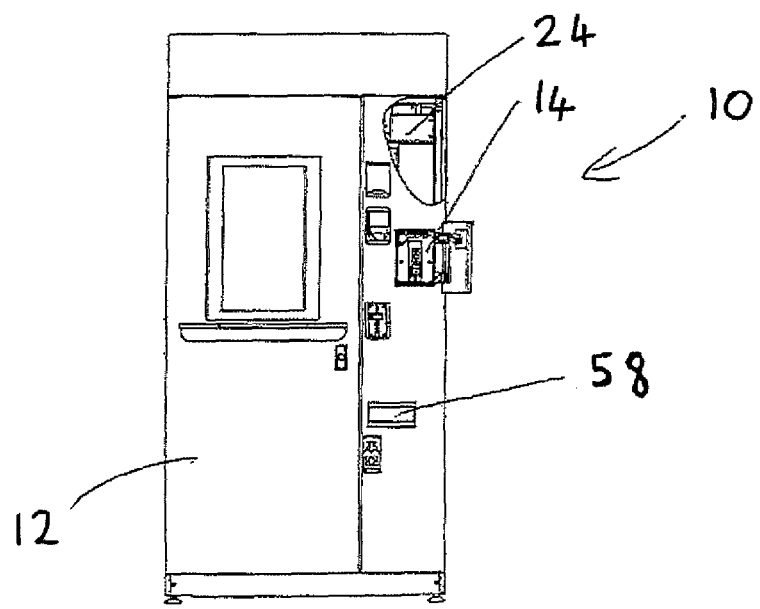
FIG. 1 is a diagrammatic part cut away front view of key cutting apparatus according to the disclosure.
Figure 2:
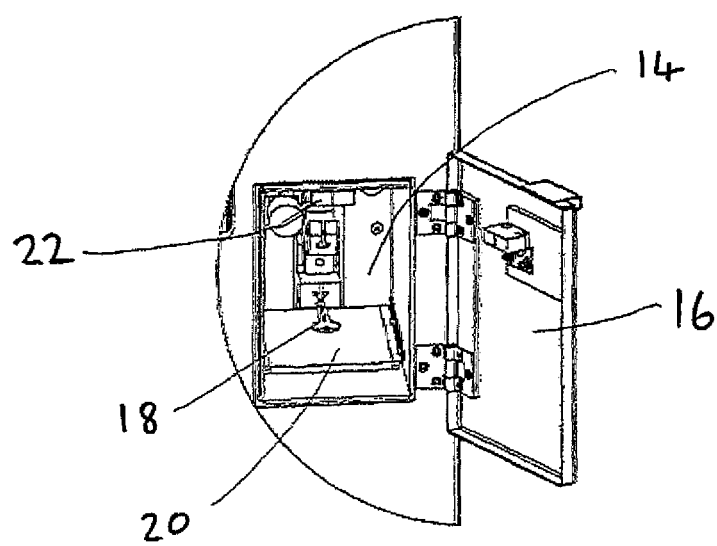
FIG. 2 is a more detailed view of part of the apparatus of FIG. 1.

The apparatus 10 comprises a cabinet 12 which could be located for instance in a supermarket, street, railway or bus station or other appropriate location. The cabinet 12 includes a chamber 14 with an openable door 16 which can receive a key 18 to be copied as illustrated in FIG. 2. As can be seen the key 18 can be located on a glass plate 20 in the chamber 14, and once the door 16 is closed as detected by a sensor 22, the profile of the key 18 can be detected by an optical reader such as a scanning camera 24 as shown in FIG. 1. The camera 24 determines the shape of the key 18 to be cut, and also the appropriate key blank type to be used to produce the copied key.

Figure 3:
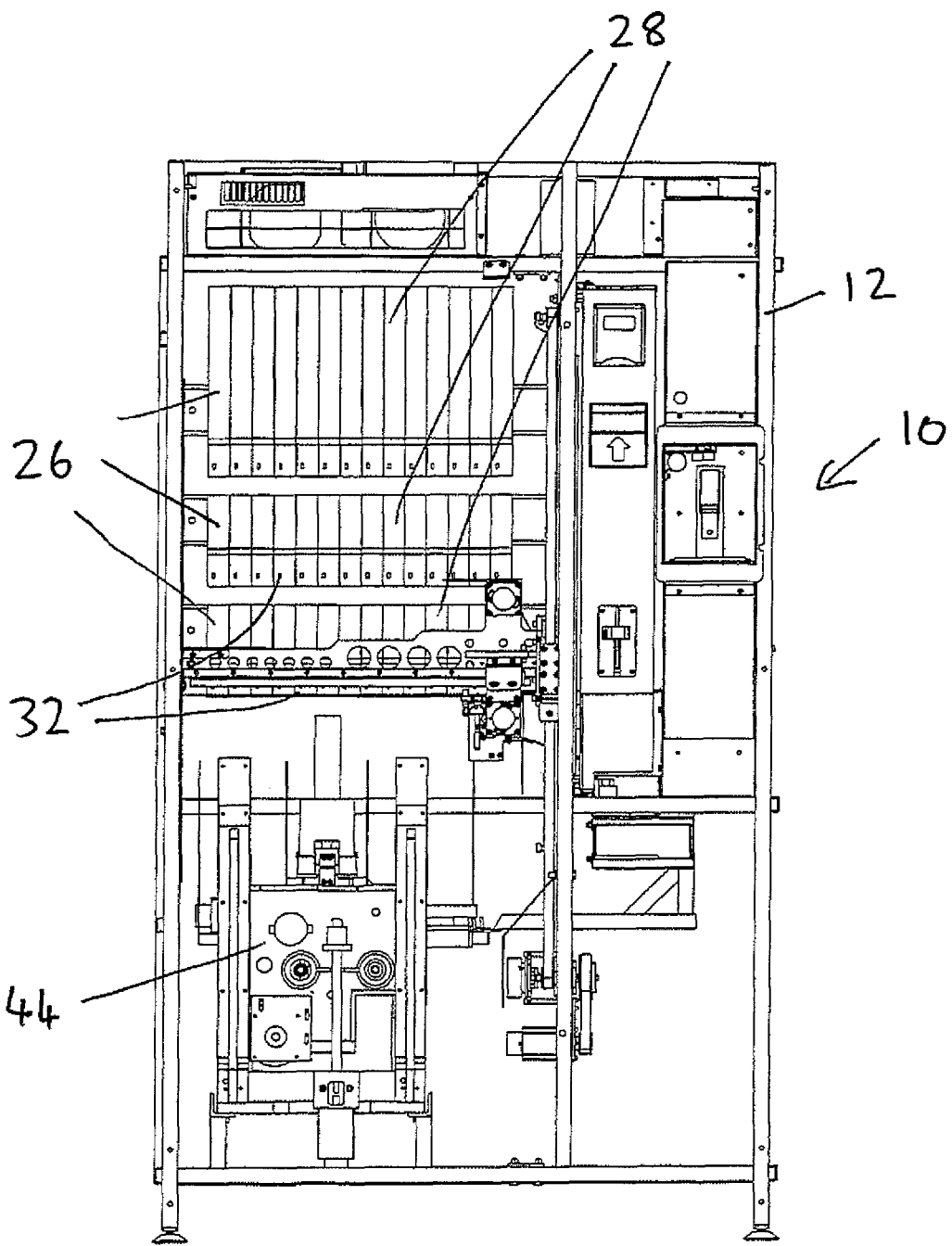
FIG. 3 is a diagrammatic front view with the front removed of the apparatus of FIG. 1.
Figure 4:
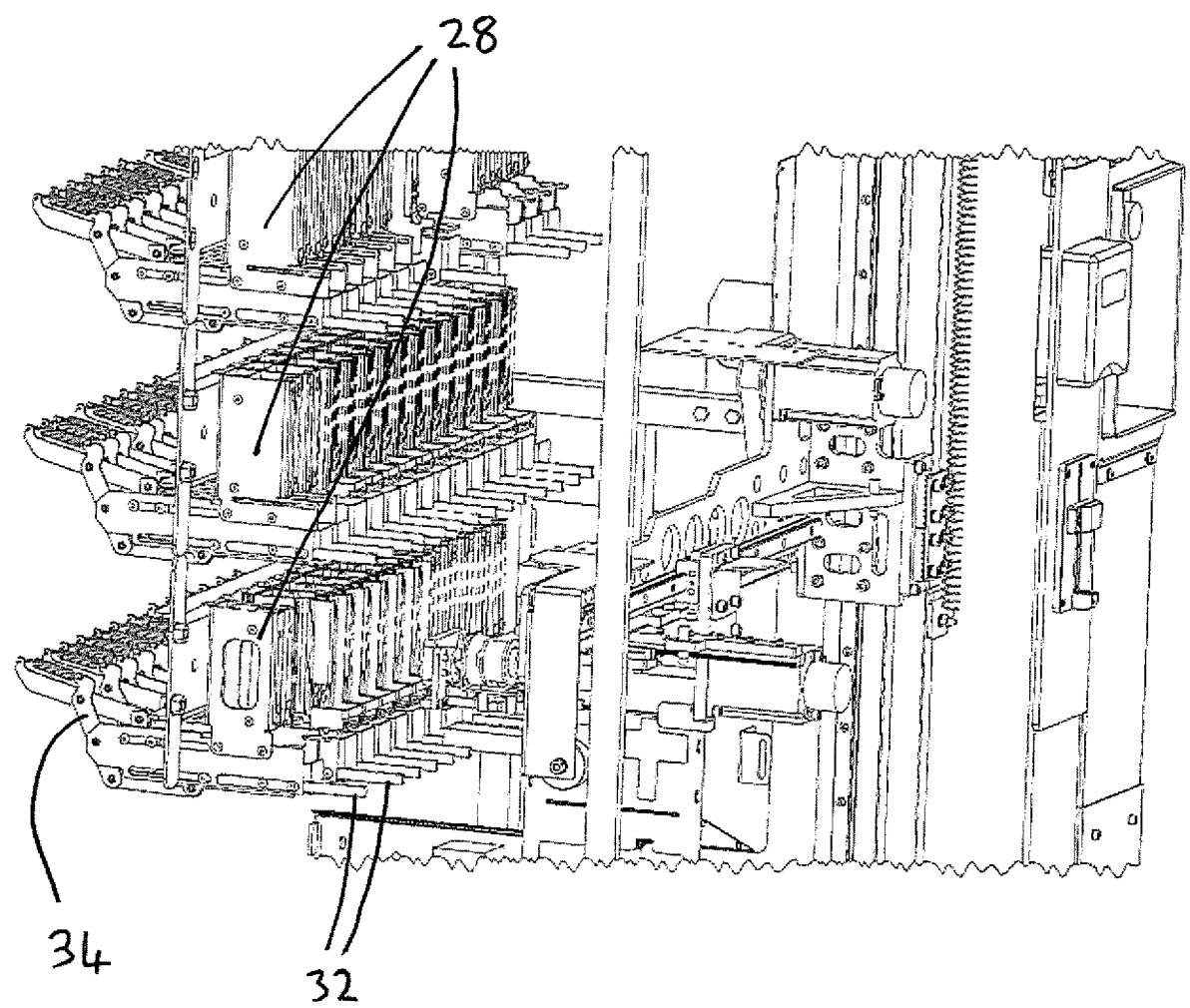
FIG. 4 is a diagrammatic perspective side view of an upper part of the apparatus of FIG. 1.
Figure 5:
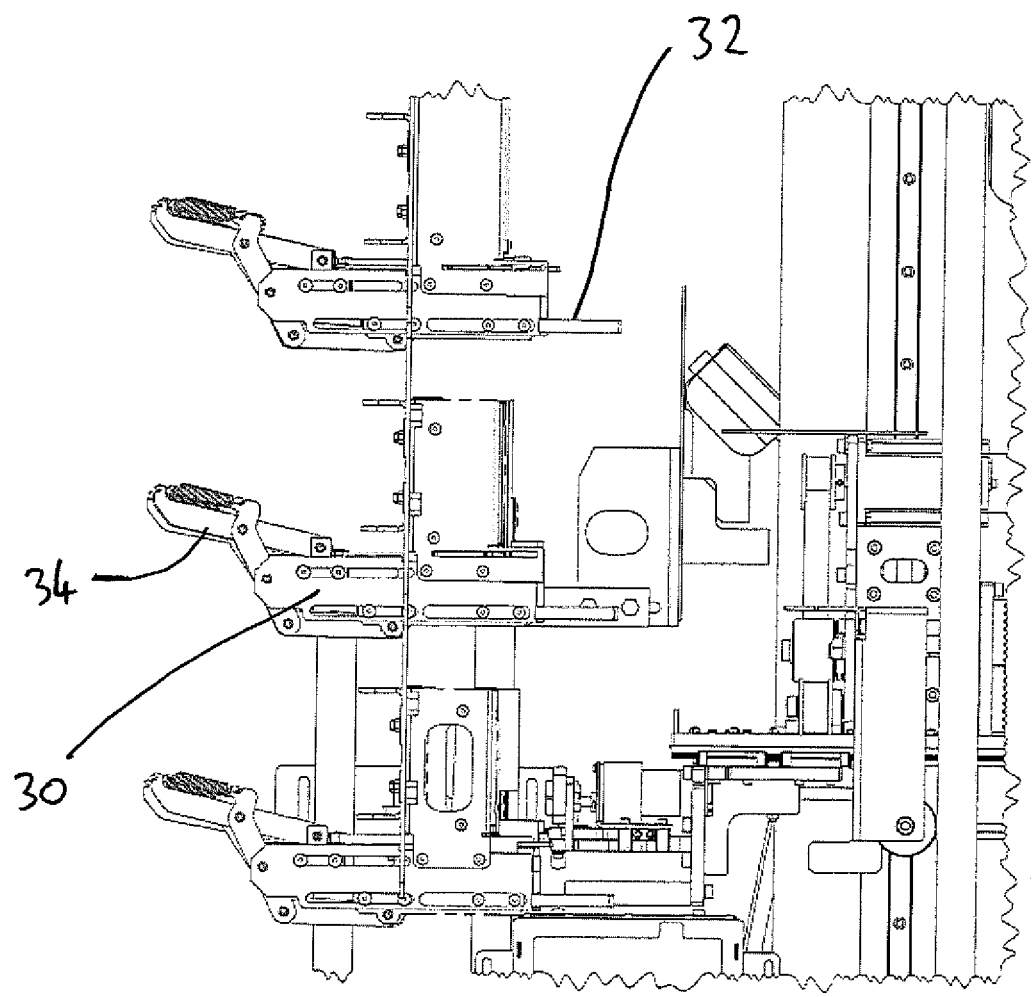
FIG. 5 is a diagrammatic side view of the upper part of the apparatus of FIG. 1.

The apparatus 10 includes a plurality of magazines 26, as shown in FIG. 3. Three rows 28 of magazines 26 are provided in the illustrated example. In this instance there are a total of forty two magazines, but any required appropriate number may be provided. It can be noted that the upper row 28 of magazines 26 are larger and would thus carry the more commonly used key blanks in greater numbers. Each magazine 26 has a blank dispenser 30 with a projecting actuator 32 pointing forwards. The actuator 32 in the form of a rod is connected to a linkage 34, such that if the actuator 32 is pushed towards the respective magazine 26, the dispenser 30 will cause a single key blank to be dispensed from the magazine 26.

Figure 6:
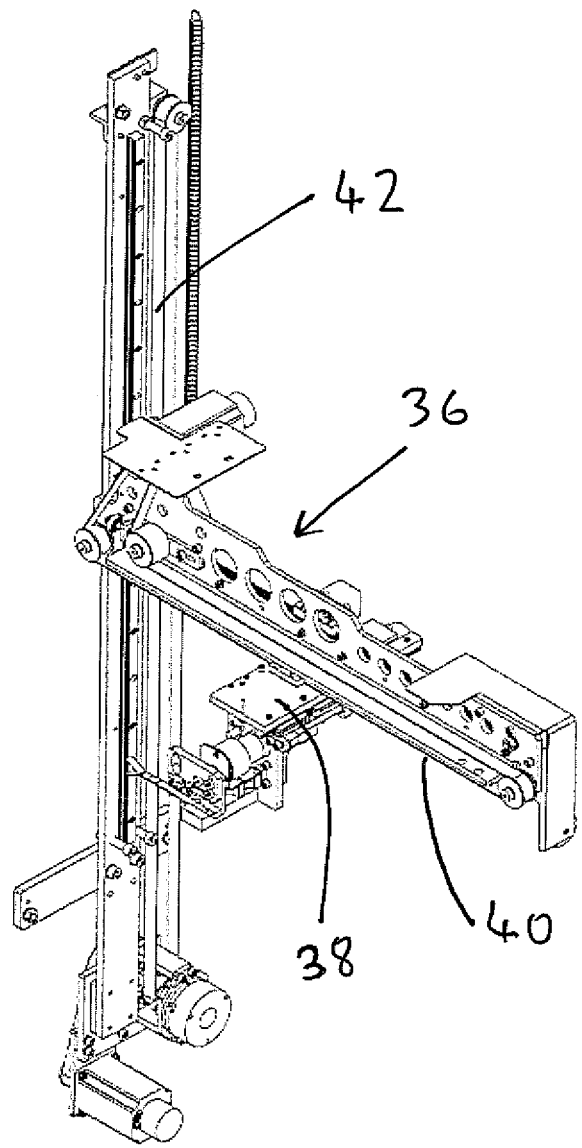
FIG. 6 is a diagrammatic perspective view of an arrangement of the apparatus of FIG. 1.

The apparatus 10 includes a key carrying arrangement 36 with a bracket 38 movable along a horizontal track 40, which horizontal track 40 is movable along a vertical track 42, as illustrated for instance in FIG. 6. A track 39 extending perpendicularly to the horizontal and vertical tracks 40, 42, is provided on the bracket 38. A clamp assembly 41 is movably mounted on the track 39 so as to be movable towards or away from the magazines 26.

Figure 9:
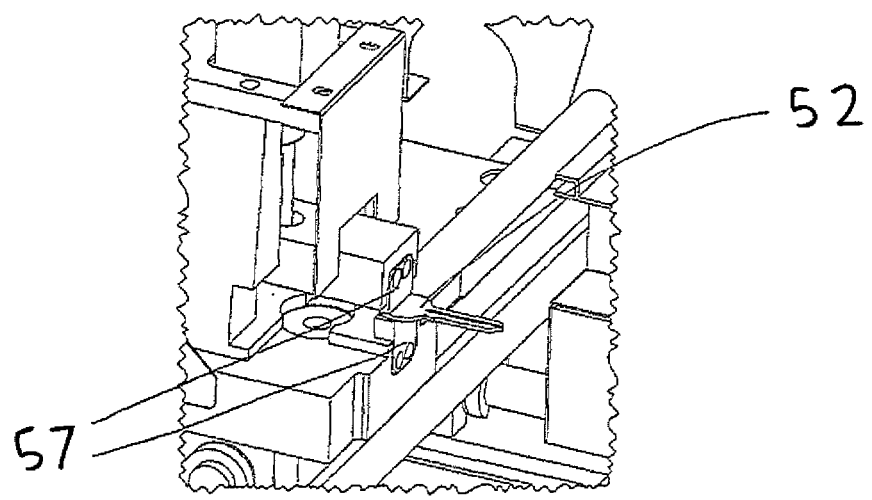
FIG. 9 is a further diagrammatic perspective view of part of the apparatus of FIG. 1 in use.
Figure 10:
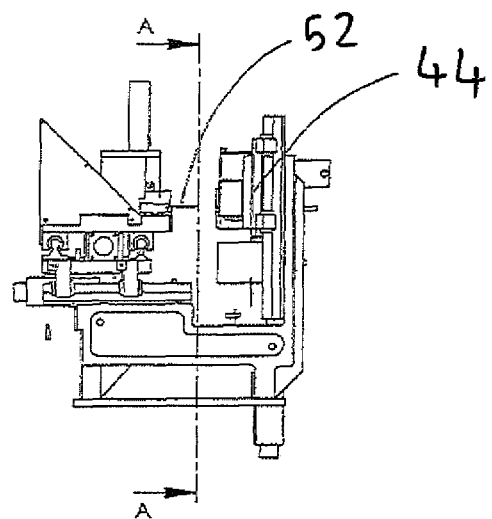
FIG. 10 is a diagrammatic side view of part of the apparatus of FIG. 1.
Figure 11:
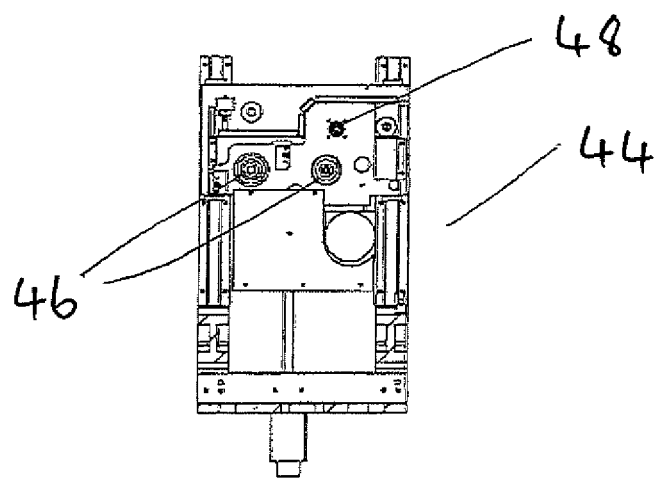
FIG. 11 is a cross-sectional view along the line A-A of FIG. 10.
Figure 12:
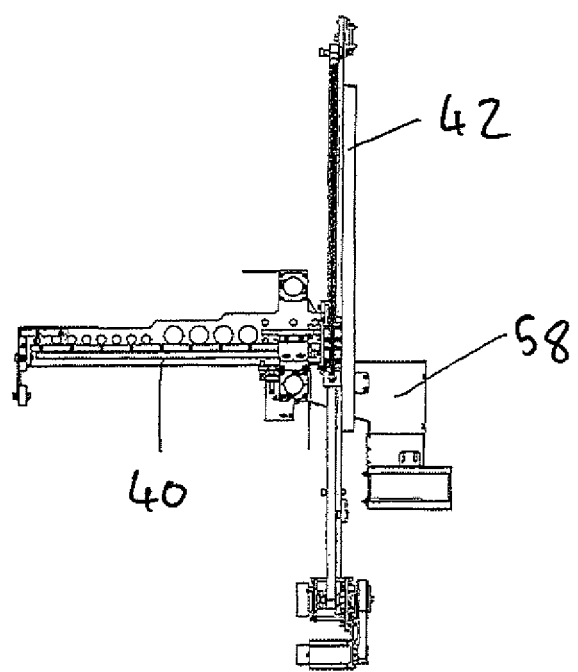
FIG. 12 is a further diagrammatic front view of the arrangement of FIG. 6.

The apparatus 10 also includes a key cutter 44 as shown for instance in FIGS. 9 to 11 which includes a pair of cutting wheels 46 and a de-burring wheel 48. An outlet 58 is provided for receiving a cut key to be delivered to a user of the apparatus 10.

In use a key 18 to be copied is located in the cabinet 12 and an image taken of the key 18. The apparatus 10 will also determine the most appropriate key blank type to use in replicating this key 18, and identify the magazine 26 holding appropriate key blanks. As the clamp assembly 41 approaches the respective magazine 26 it will engage with the respective projecting actuator 32. This will cause a key blank 52 to be dispensed which will be held by the clamp assembly 41 such that the blade of a dispensed key blank 52 is held.

Figure 7:
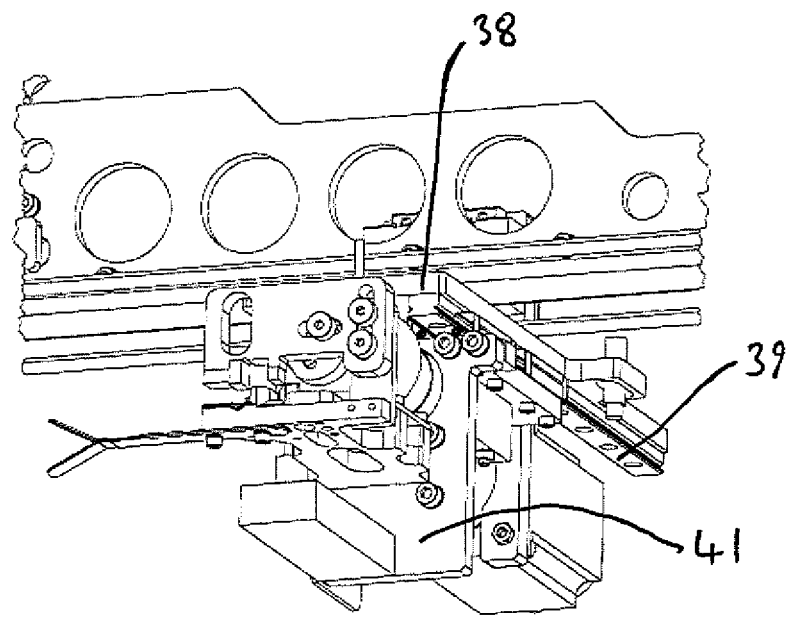
FIG. 7 is a diagrammatic perspective view from beneath of part of the arrangement of FIG. 6.
Figure 8:
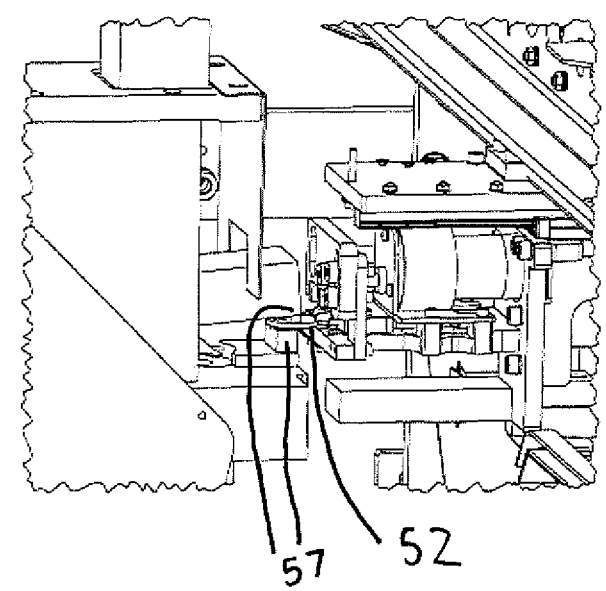
FIG. 8 is a diagrammatic perspective view of part of the apparatus of FIG. 1 in use.

FIG. 7 diagrammatically shows the clamp assembly 41, in which a key blank 52 will be carried. The key blank 52 will be delivered to the key cutter 44 where the blank 52 will be held by the head of the blank 52 by two jaws 57, as shown in FIGS. 8 and 9.

Figure 13:
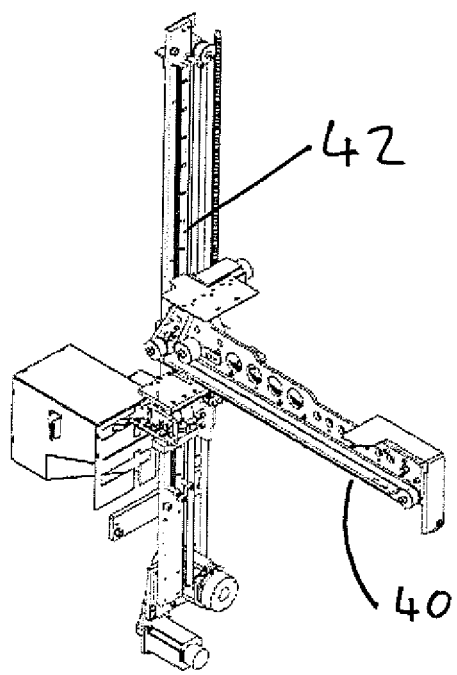
FIG. 13 is a diagrammatic rear perspective view of the arrangement of FIG. 12.
Figure 14:
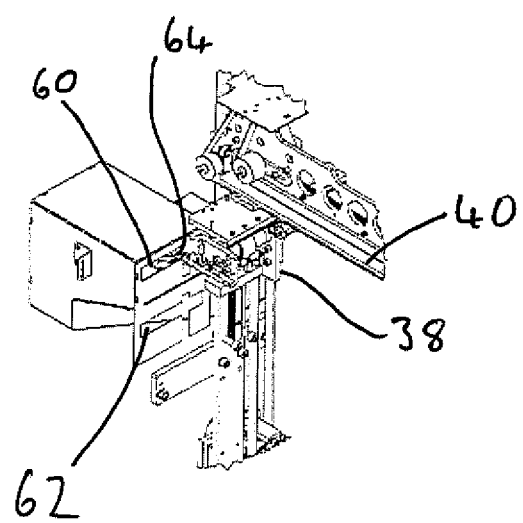
FIG. 14 is a detailed view of part of FIG. 13.
Figure 15:
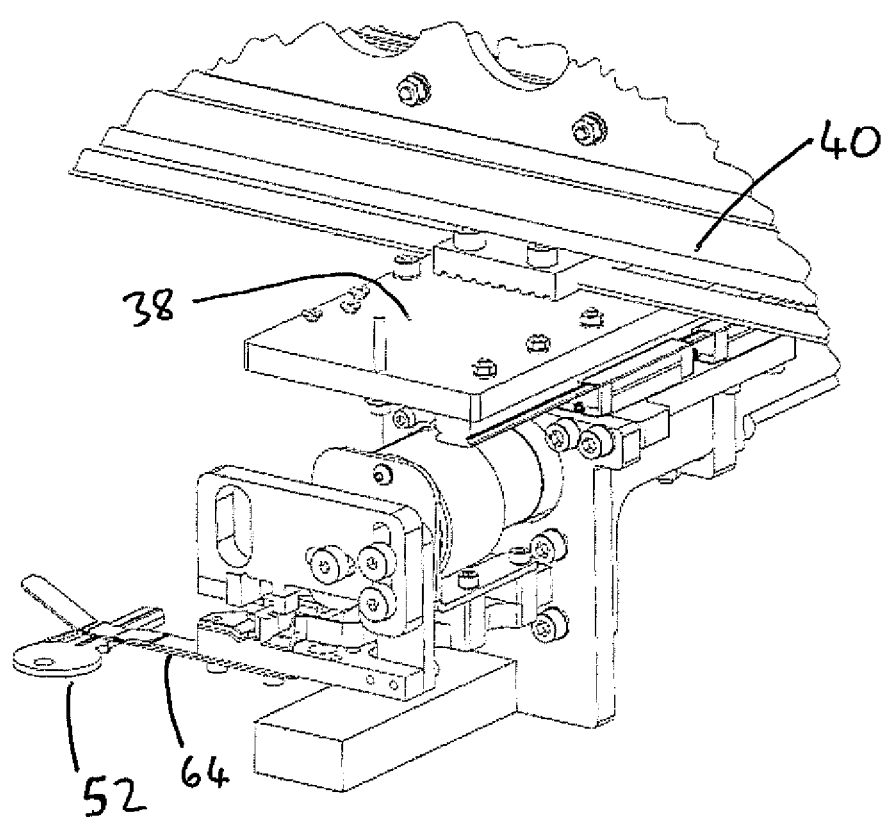
FIG. 15 is a diagrammatic perspective view from above of part of the arrangement of FIG. 6.

Once the key blank cutting operation has been completed and the blank 52 de-burred, the key carrying arrangement 36 will take the cut key 59 and deliver it to an outlet 58 in the cabinet 12, as shown in FIGS. 13 and 14. FIGS. 13 and 14 show an upper slot 60 where cut keys are posted through. A lower slot 62 is provided where any reject keys can be posted for later removal. The cut key 59 is carried by a spring clip 64 on the clamp assembly 41, as shown in FIG. 15. The profile of the slots 60, 62 enables the cut key 59 to be pulled off the spring clip 64.

Key Carrying Arrangement

The key carrying arrangement 36 includes the clamp assembly 41. The assembly includes a lever key clamp arrangement and a cylinder key clamping arrangement for selectively respectively either clamping a lever key blank 600 or a cylinder key blank 500 in a required position on the assembly 41. The required positions for respectively clamping either a lever key blank 600 or a cylinder key blank 500 are located adjacent one another.

Figure 21:
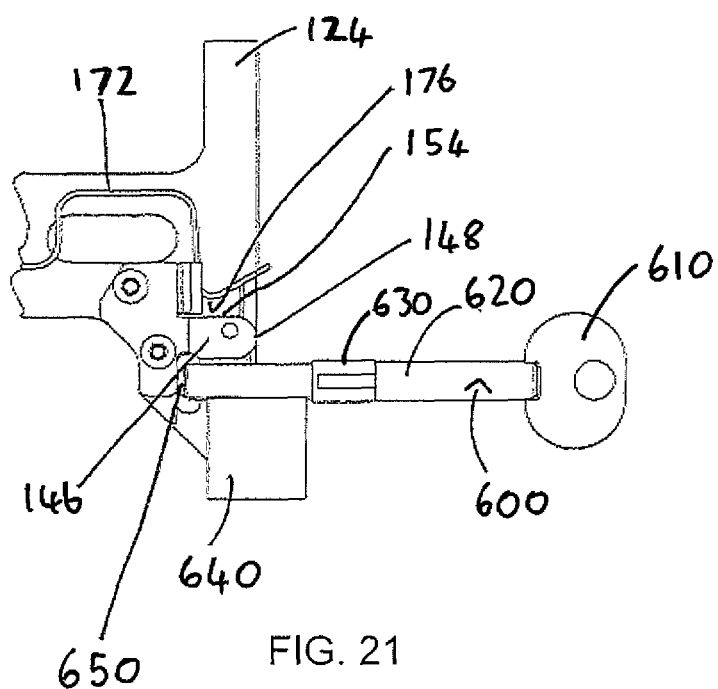
FIG. 21 is a diagrammatic plan view of part of the assembly as shown in FIG. 19.
Figure 27:
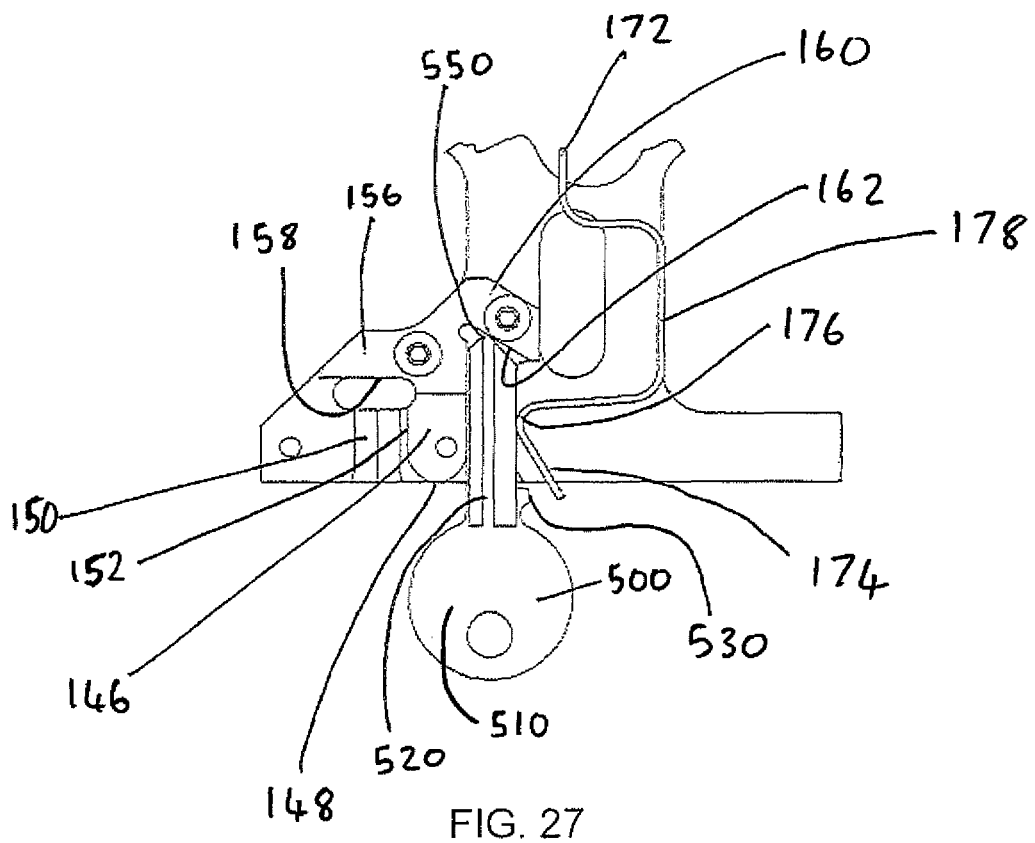
FIG. 27 is a similar view to FIG. 26 but with further components removed.
Figure 28:
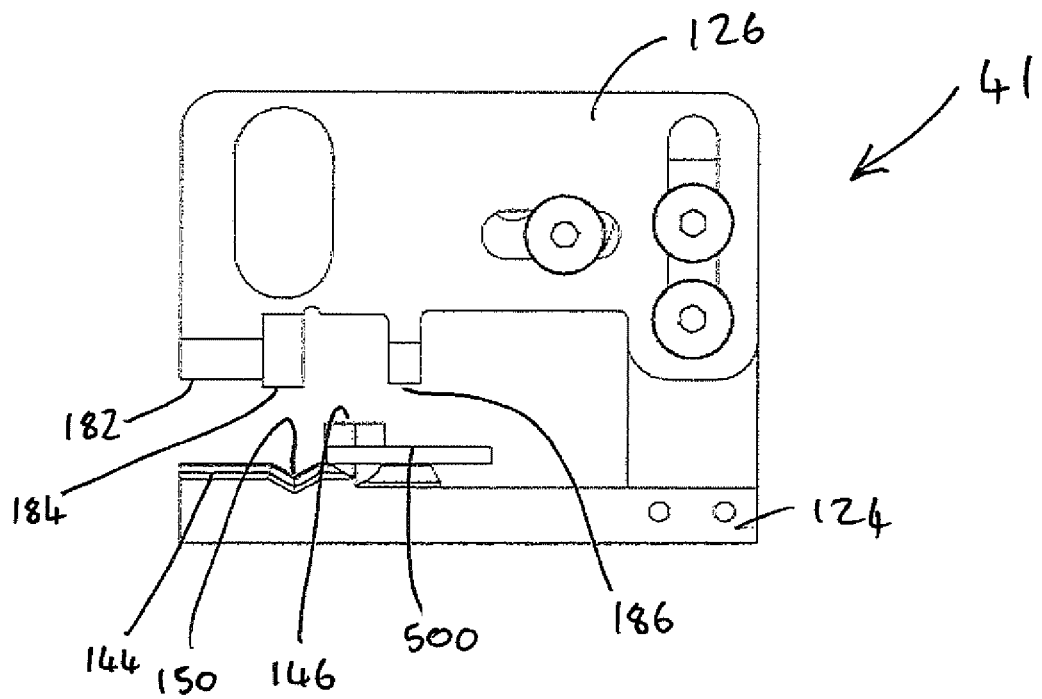
FIG. 28 is a similar view to FIG. 22 but with a cylinder key blank in the assembly.

Lever key blanks 600 and cylinder key blanks 500 are shown in FIGS. 21 and 27 respectively. A cylinder key blank 500 has a head 510, and a relatively flat shank 520, with an ear 530 on one side thereof, adjacent the head 510. A lever key blank 600 has a relatively flat head 610, with a cylindrical shank 620 extending therefrom. Part way along the length of the shank 620 a collar 630 is provided of greater diameter than the rest of the shank 620. Beyond the collar 630 on one side of the shank 620 is provided a blade 640.

Figure 16:
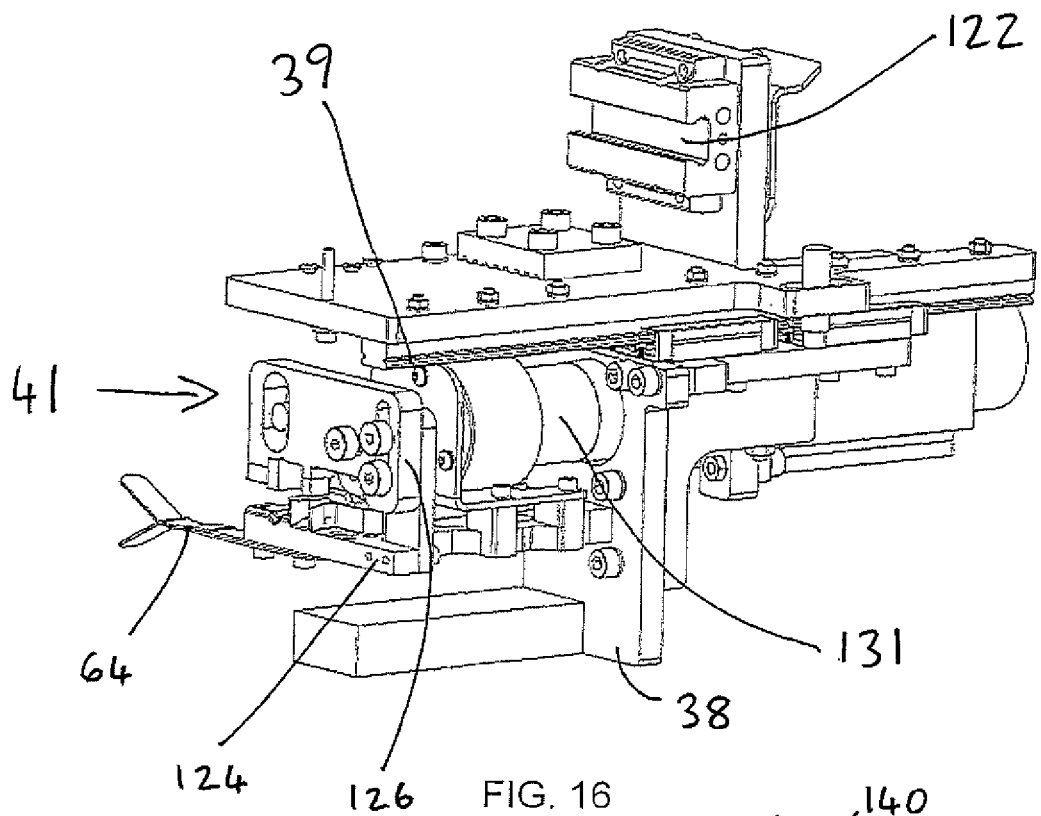
FIG. 16 is a diagrammatic perspective view of a key clamp assembly, which forms part of a key cutting apparatus according to the disclosure.

In FIG. 16 the assembly 41 is shown mounted on the bracket 38 which is selectively movable forwards and rearwards along the track 39 which is shown. The assembly 41 can also be moved laterally along a further track 122 which is diagrammatically shown.

Figure 22:
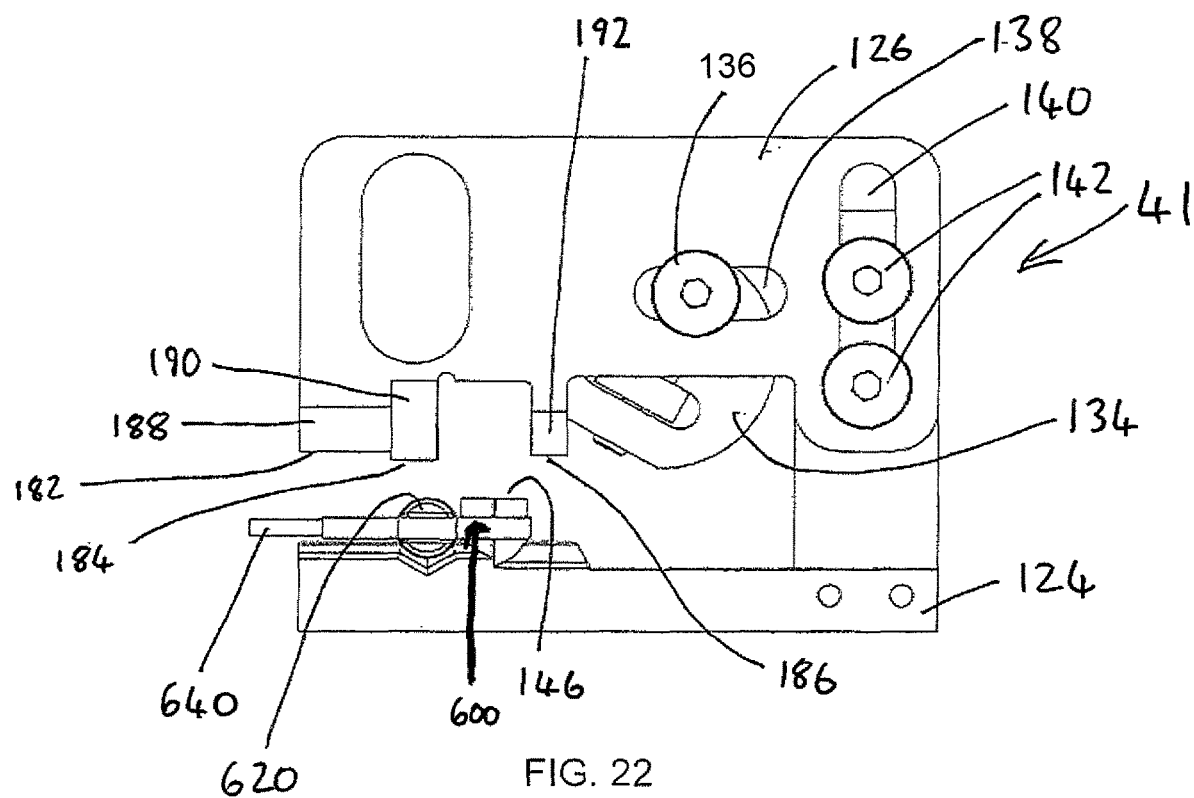
FIG. 22 is a diagrammatic front view of the assembly in the condition shown in FIG. 19.
Figure 23:
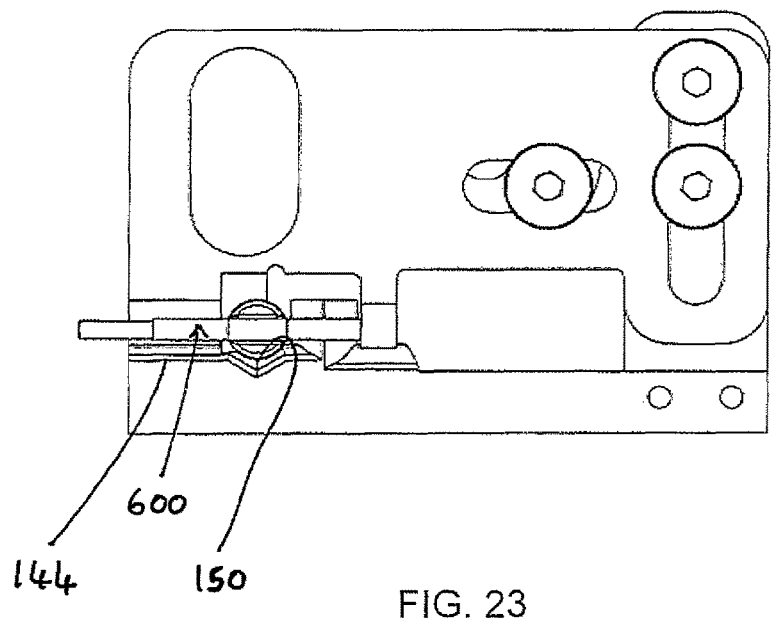
FIG. 23 is a similar view to FIG. 22 but with the assembly in a clamped condition.
Figure 24:
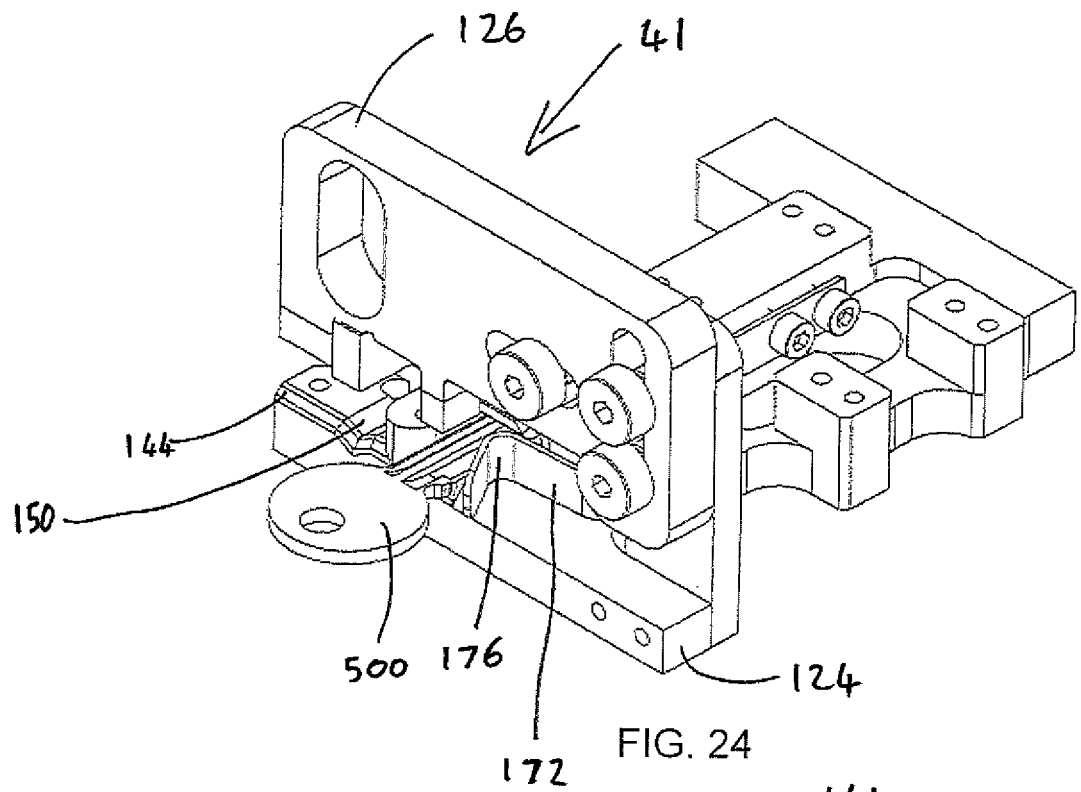
FIG. 24 is a similar view to FIG. 19 but with a number of components removed and with a cylinder key blank on the assembly.
Figure 25:
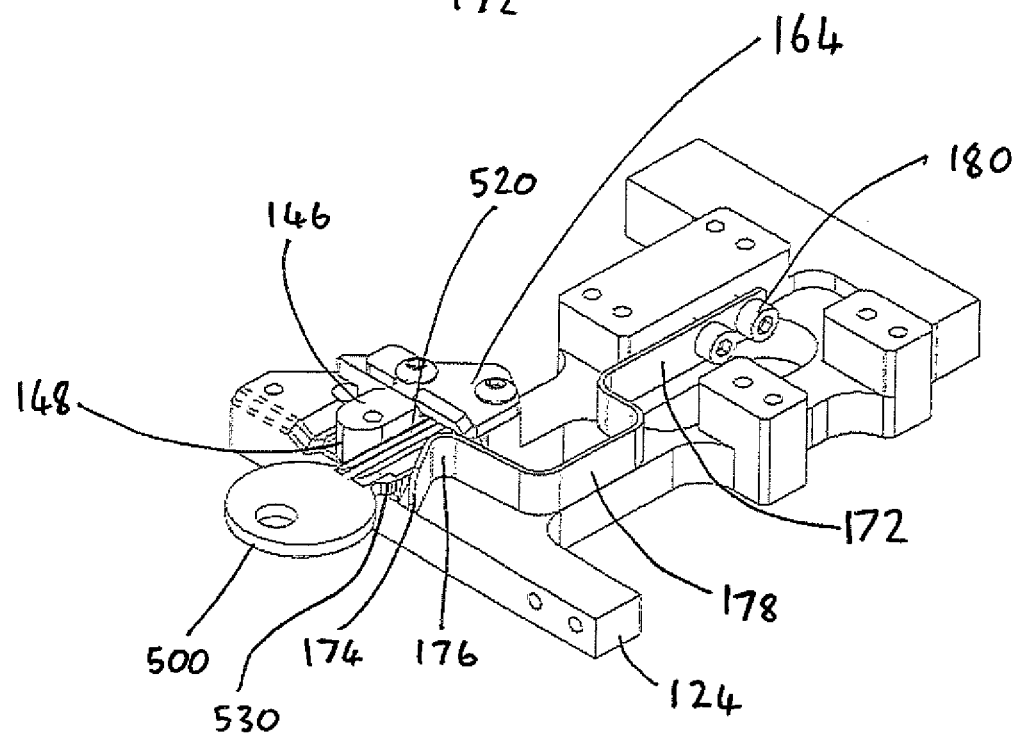
FIG. 25 is a similar view to FIG. 24 but with further components removed.
Figure 26:
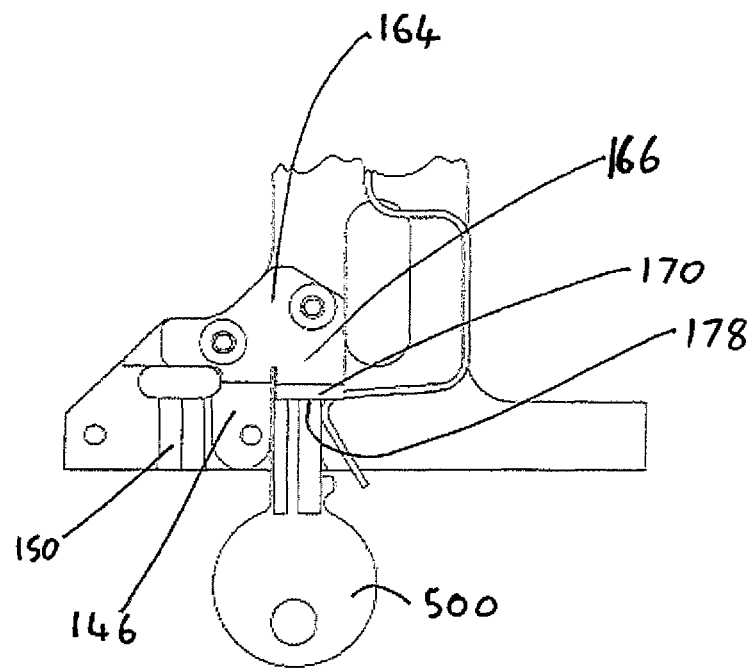
FIG. 26 is a plan view of the assembly of FIG. 24 with a number of components removed.

The assembly 41 includes first and second clamp plates 124, 126. The first clamp plate 124 is in the form of a profiled horizontally aligned plate. The second clamp plate 126 is in the form of a profiled vertically aligned plate which is selectively movable towards or away from the first clamp plate 124 between a clamped and an unclamped position, as shown respectively in FIGS. 22 and 23.

A motor 131 is provided which drives a cam 134 with a pin 136 extending through a horizontal slot 138 in the second clamp plate 126, such that rotation of the cam 134 causes the second clamp plate 126 to move upwardly or downwardly as required. A vertically extending slot 140 is provided in the second clamp plate 126, with a spaced pair of pins 142 extending therethrough to guide movement of the second clamp plate 126 in a vertical direction.

Figure 20:
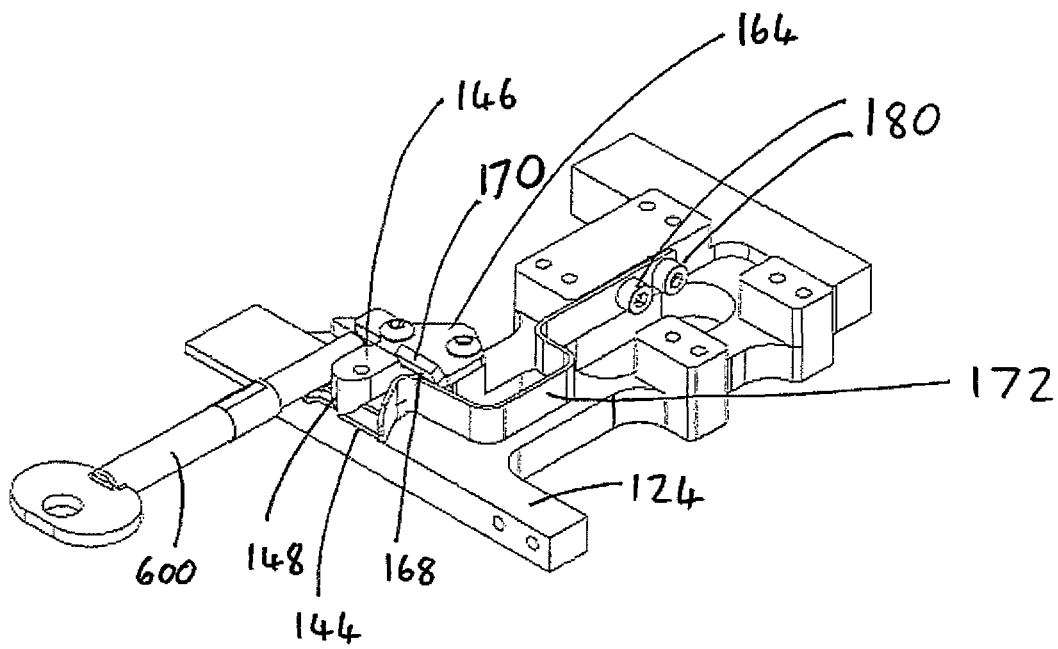
FIG. 20 is a similar view to FIG. 19 but with a number of components removed.

The first clamp plate 124 is perhaps best seen in FIGS. 20 and 27 and comprises a chamfered front edge 144 to the plate 124, at least on the left hand side thereof. A projection 146 is upstanding on the first clamp plate 124, and has a rounded front end 148. To the left of the projection 146 as viewed from the front, an elongate indent 150 is provided with a shallow V shape profile. The left hand side of the projection 146 when viewed from the front provides a first surface 152 usable with lever key blanks 600, whilst the right hand side provides a third surface 154 usable with cylinder key blanks 500.

Spaced from the front edge 144 of the first clamp plate 124, the projection 146 also extends transversely 156 to the left as viewed from the front to provide a second surface 158 against which the distal end 650 of a lever key blank 600 can engage.

The projection 146 on the right hand side as viewed from the front has a right hand transverse extension 160 which is behind the left hand transverse extension 156. The extension 160 is inclined forwards as well as transversely to define a fourth inclined surface 162.

A plate 164 which forms a guide 166 is mounted to the left and right transverse extensions 156, 160 so as to be spaced above and parallel to the first clamp plate 124 and has a front edge 168 forwards of the right hand transverse extension, with an upwardly inclined lip 170.

A resilient member in the form of a profiled sprung member 172 is provided on the right hand side of the projection 146 and extends just in front of the front edge 144 of the first clamp plate 124. The profiled sprung member 172 has a front section 174 which is inclined outwardly to a bend 176 to an outwardly extending section 178, which bend 176 provides an urging point engageable against a cylinder key blank 500 on the plate 124. The profiled sprung member 172 is held in place by a pair of screws 180.

The second clamp plate 126 provides from the left hand side, first, second and third grips 182, 184, 186. The first grip 182 extends from the left hand end as viewed from the front of the second clamp plate 126 to a point just above and before the start of the elongate indent 150. The first grip 182 is made of a block 188 of a relatively hard resilient material, which may be a foamed material.

The second grip 184 extends from the second clamp plate 126 above the majority of the elongate indent. The second grip 184 extends downwardly to a further extent than the first grip 182, and is made of a block 190 of softer resilient material, which again may be a foamed material.

The third grip 186 is spaced from the second grip 184, just beyond the projection 146. The third grip 186 extends downwardly for a distance between that of the first and second grips 182, 184 and is made of a blank 192 of a similar hard resilient material as the first grip 182.

Figure 17:
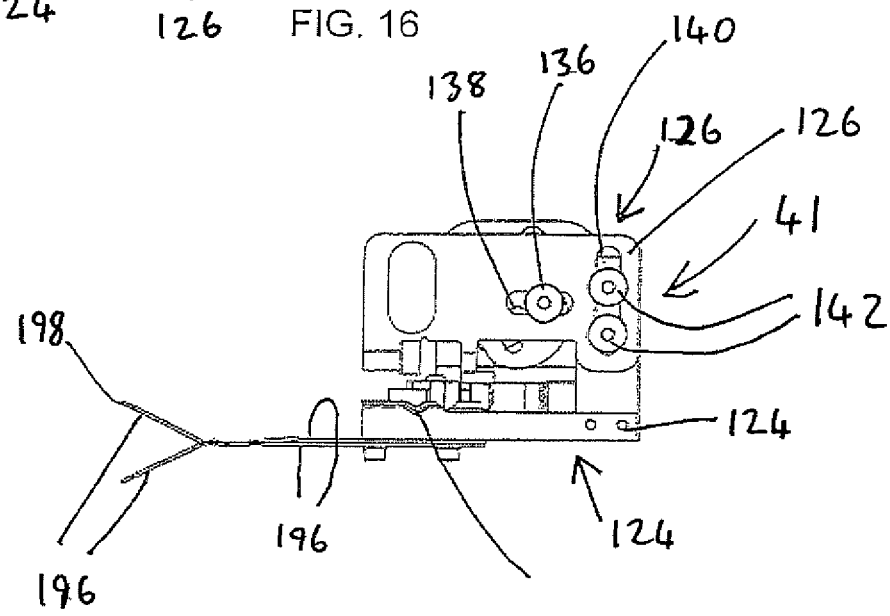
FIG. 17 is a diagrammatic front view of the key clamp assembly of FIG. 16 in an unclamped condition.
Figure 18:
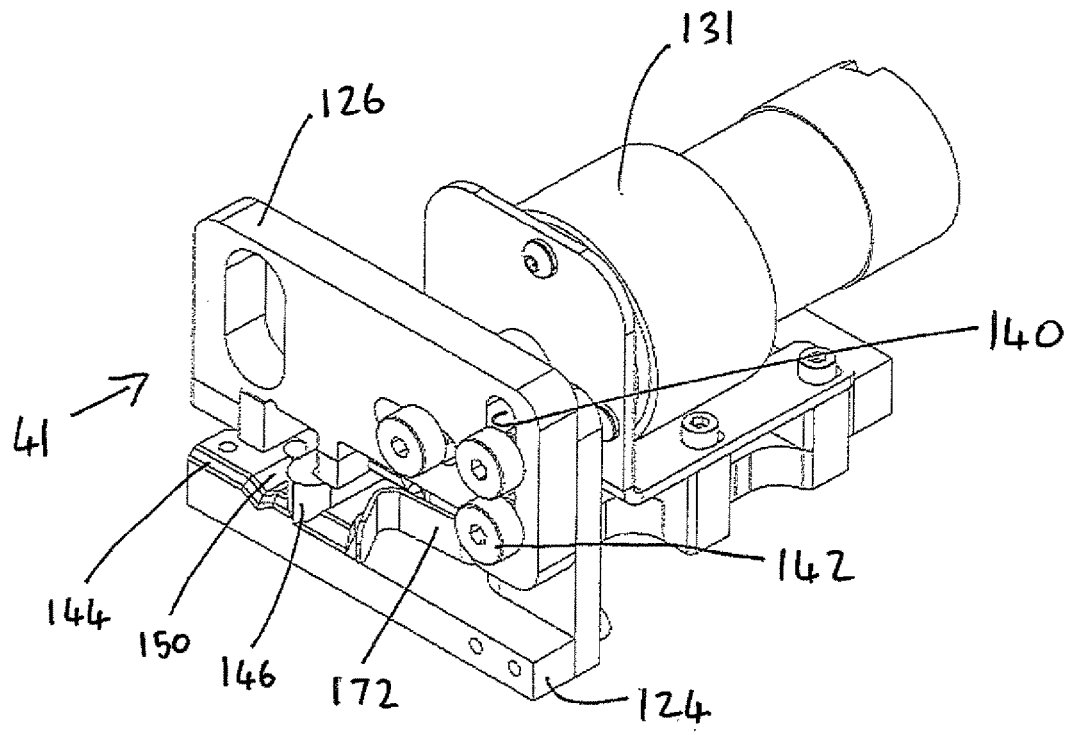
FIG. 18 is a front perspective view of the key clamp assembly of FIG. 16 in an unclamped condition.
Figure 19:
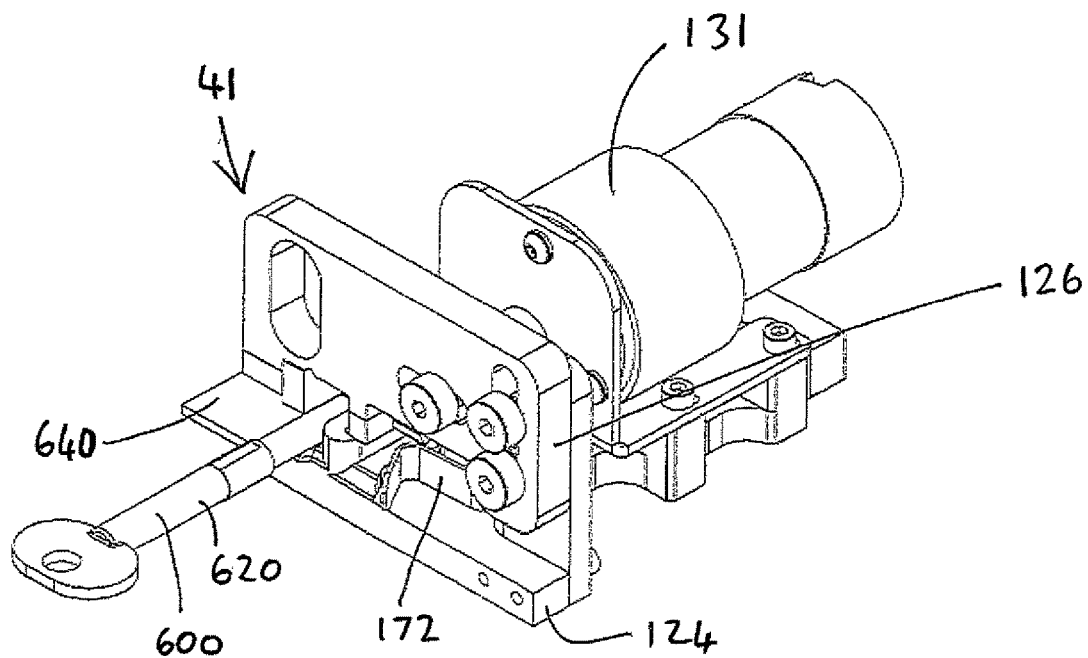
FIG. 19 is a similar view to FIG. 18, but with a lever key blank located on the key clamp assembly of FIG. 16.

FIGS. 16 and 17 show the spring clip 64 formed from two strips 196 of spring material which are urged together and have diverging ends 198. The spring clip 64 is mounted to an underside of the first clamping plate 124, and extends to the left thereof as seen from the front.

In use the clamp assembly 41 can be moved to take a required key blank 500, 600 from for instance a respective magazine or other holder and hold the key blank 500, 600 in an accurate required position. The key blank 500, 600 can then be taken for instance to the key cutter 44 where the key blank 500, 600 is held by the head 510, 610 and cut as required. The clamp assembly 41 can then be moved to take the cut key blank and hold it in the spring clip 64 for delivery to the outlet 58 of the cabinet 12.

FIGS. 19 to 23 shows the distal end 650 of a lever key blank 600 located in the elongate indent 150, with the distal end 650 of the blank 600 engaging against the second surface 158. The blade 640 of the blank 600 extends on the opposite side of the shank 620 to the projection 146. The part of the shank 620 opposite the blade 640 may engage against the first surface 152. The second clamp plate 126 is brought downwardly by the motor 131 such that the first grip 182 engages against the blade 640 to urge it against the first clamp plate 124. The second grip 184 engages against the shank 620 to hold it in position in the elongate indent 150.

FIGS. 24 to 29 show the assembly 41 in use with a cylinder key blank 500. In this instance the cylinder key blank 500 locates to the right hand side of the projection 146, with the side of the key blank shank 520 without the ear 530 abutting against the third surface 154. The distal end 550 of the cylinder key blank 500 engages against the fourth surface 162, and the inclination of the fourth surface 162 urges the cylinder key blank 500 against the third surface 154 along the length thereof. The sprung member 172 also urges the key blank 500 against the third surface 154. The guide 166 prevents the cylinder key blank 500 from for instance turning to a vertical alignment.

Figure 29:
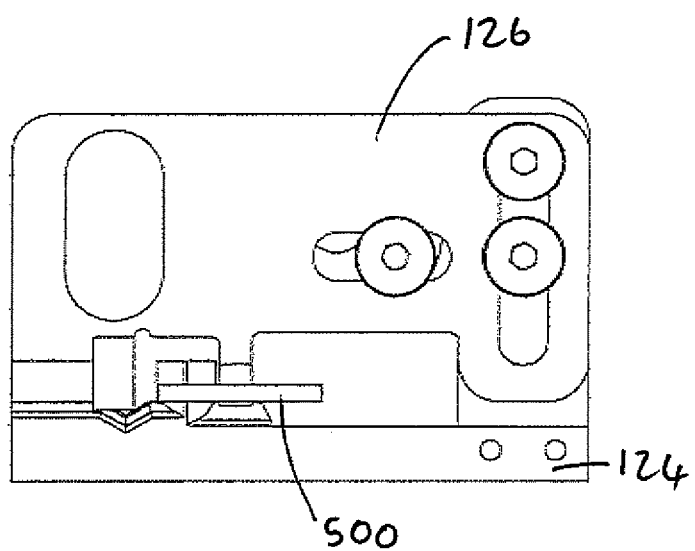
FIG. 29 is a similar view to FIG. 28 but with the assembly in a clamped condition.
Figure 30:
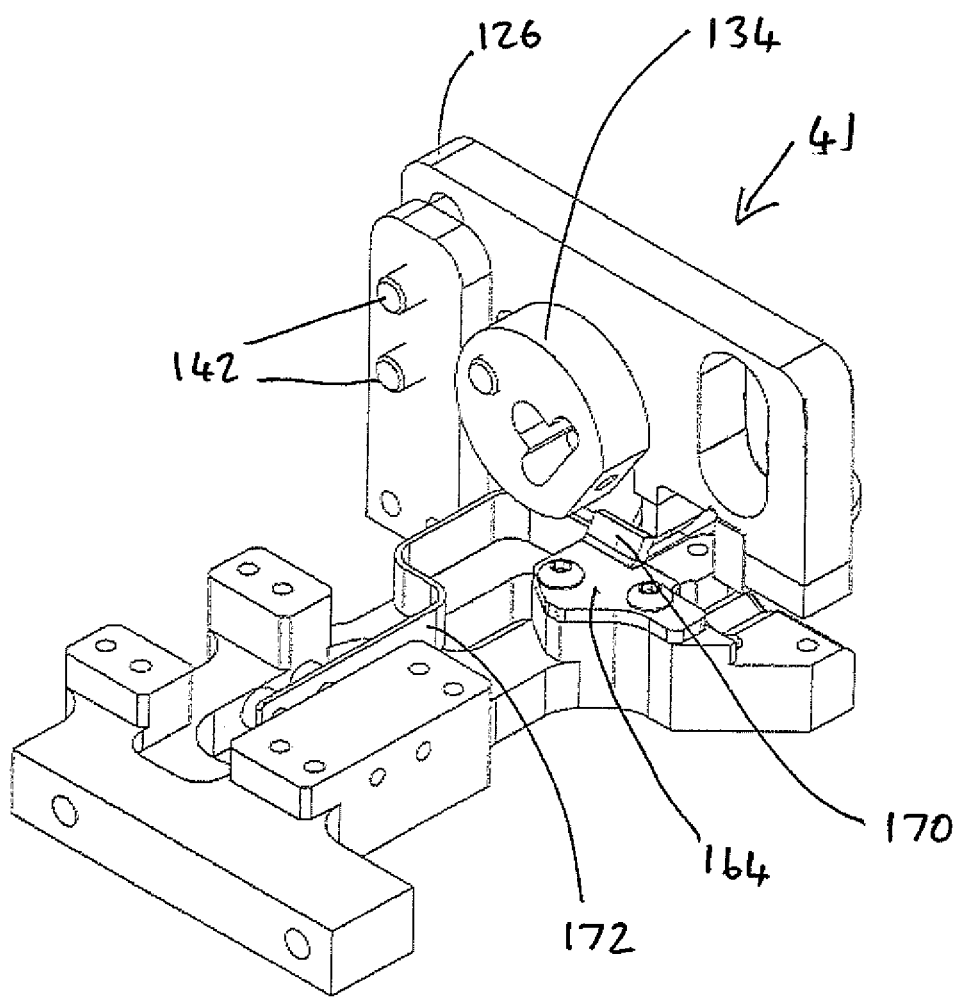
FIG. 30 is a perspective rear view of part of the assembly of FIG. 16.
Figure 31:
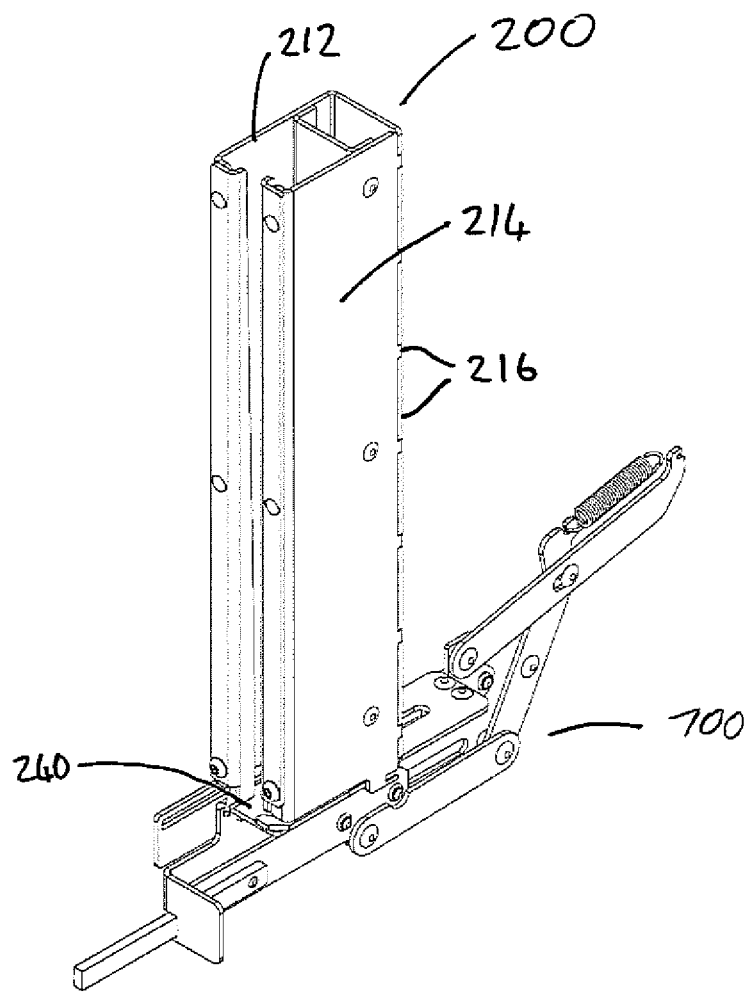
FIG. 31 is a diagrammatic perspective view of a dispenser and a magazine for cylinder key blanks, which forms part of a key cutting apparatus according to the disclosure.
Figure 32:
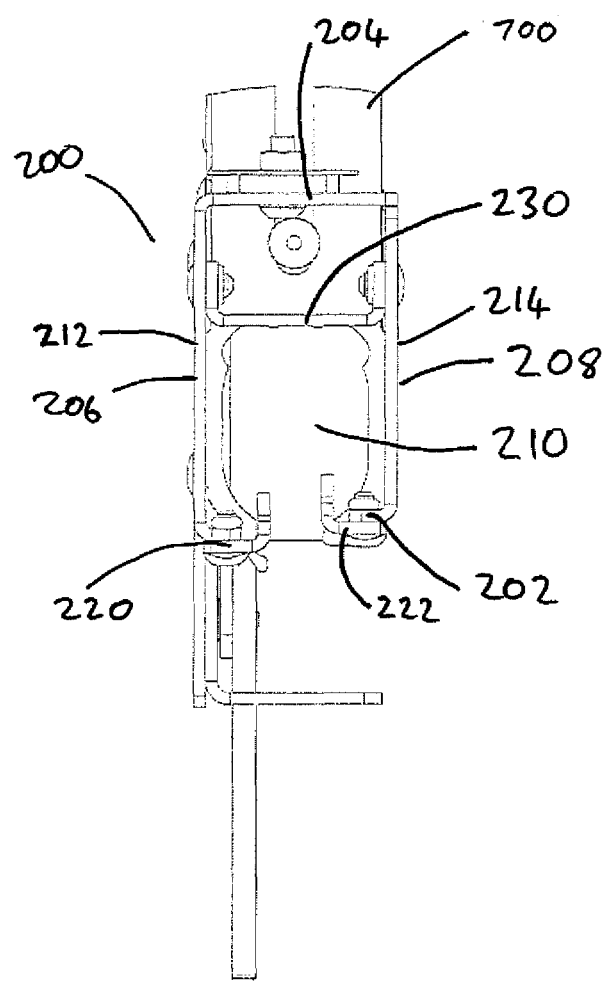
FIG. 32 is a plan view of part of the dispenser and the magazine of FIG. 31.
Figure 33:
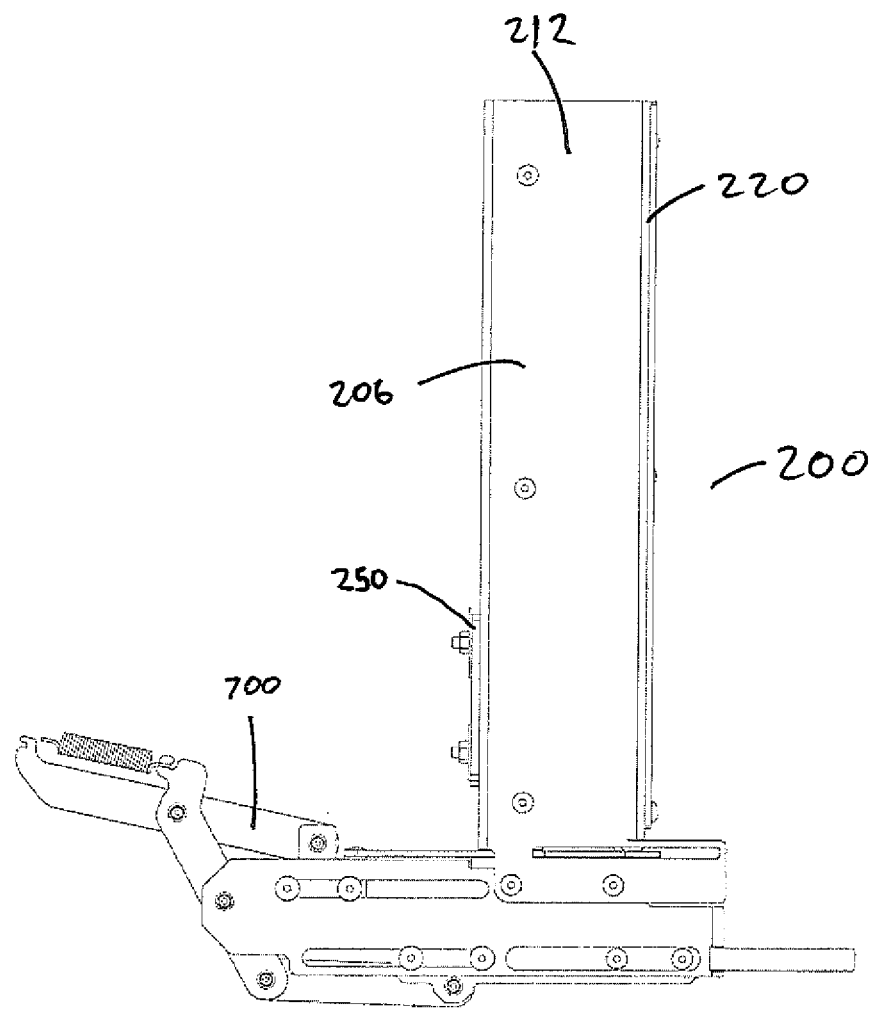
FIG. 33 is a side view of the dispenser and magazine of FIG. 31.
Figure 34:
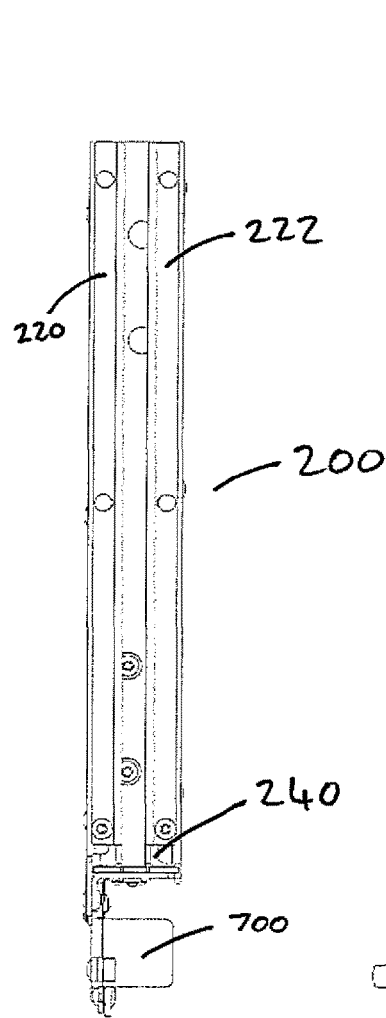
FIG. 34 is a front view of the dispenser and magazine of FIG. 31.
Figure 35:
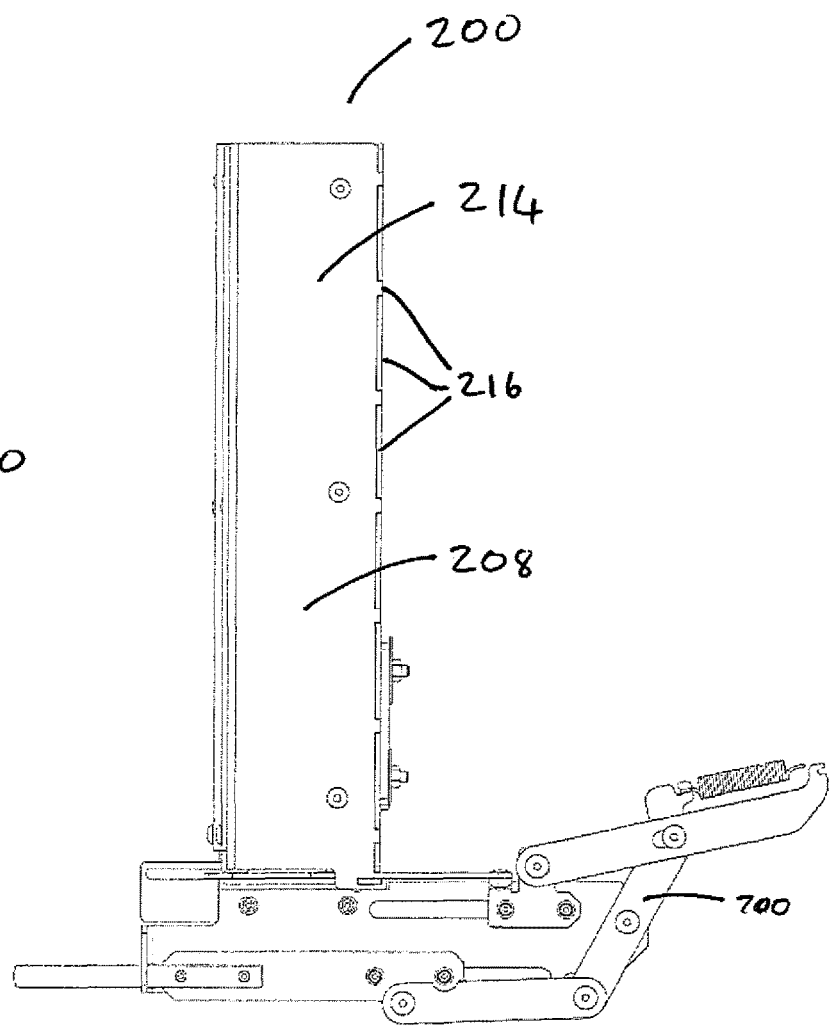
FIG. 35 is a further side view of the dispenser and magazine of FIG. 31.

The second clamp plate 126 is then brought downwardly by the motor 131, with the third grip 186 engaging against the cylinder key blank 500 to retain it in position, as shown for instance in FIG. 29.

The assembly includes a number of features to help guide the respective key blank into position such as the chamfered front edge, the profiled sprung member, and the lip on the guide.

Magazines

A magazine 26 for storing a number of cylinder key blanks is shown in for instance FIGS. 31-35, and the magazine shown in FIGS. 31-35 will be referred to as a cylinder key magazine 200 hereafter. The cylinder key magazine 200 has front and rear ends 202, 204 and first and second sides 206, 208 defining a vertically extending opening 210 (see FIG. 32 for example). The cylinder key magazine 200 has an internal profile to engage with the head 510 and shank 520 of a key blank 500 to provide a correct alignment thereof.

The first side 206 and rear end 204 of the magazine is made from a single first bent sheet 212 of material in this example, which may be sheet steel. A second sheet 214 of material, which may also be sheet steel, forms the second side 208 and is retained against the first sheet 212 by means of interlinking castellations 216 provided on both the first and second sheets 212, 214.

The front end 202 of the cylinder key magazine 200 includes first and second guides (or guide plates) 220, 222, which are fastened to the first and second sheets 212, 214 respectively. Each guide plate 220, 222 is bent to extend into the opening 210 and abut against a respective side of the shanks 520 of the stacked cylinder keys retained in the magazine 200. The second guide plate 222 extends further into the vertical opening 210 relative to the first guide plate 220.

Figure 44:
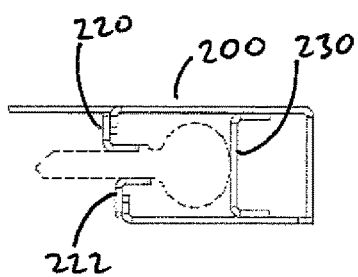
FIG. 44 is a plan view of the magazine of FIG. 31, showing the magazine without fasteners, and showing the outline of a cylinder key using a broken line.

The end of the second guide plate 222 engages against the head 510 of the cylinder keys adjacent to the shank 520, and the end of the first guide plate 220 engages against the ear 530 of the cylinder key blanks, as demonstrated for instance in FIG. 44. Alternatively, the first guide plate 220 may extend further into the vertical opening 210 relative to the second guide plate 222 if the ear 530 of the cylinder key blank 500 is on the other side of the shank 520. However, in other embodiments, where the cylinder key blank 500 includes ears 530 on both sides of the shank 520, the first and second guide plates 220, 222 may extend for the same distance into the vertical opening 310.

The first and second guide plates 220, 222 may be fastened to the first and second sheets 212, 214 respectively by fasteners such as rivets which extend through apertures in the guide plates 220, 222 and the first and second sheets 212, 214.

In some instances, the first and second guide plates 220, 222 may be adjustably fastened to the first and second sheets 212, 214 respectively, such that the guide plates 220, 222 can be moved closer to or further away from the keys held in the magazine 200. At least one of the apertures in the first and second sheets 212, 214 may be elongate (e.g. discorectangular shaped, which is a shape constructed of a rectangle with semicircles at a pair of opposite sides), to allow the position of the first or second guide plates 220, 222 relative to the respective first or second sheet 212, 214 to be adjusted.

A u-shaped back plate 230 for engaging against the head 510 of the cylinder keys is provided inside the vertically extending opening 210. The back plate extends from the first side 206 to the second side 208 of the opening 210, and is fastened to both the first and second sheets 212, 214 by fasteners such as rivets which extend through apertures in the back plate 230 and the first and second sheets 212, 214. Similarly to the guide plates 220, 222, the back plate 230 may be adjustably fastened to the respective first and second sheets 212, 214, such that the back plate 230 can be moved closer to or further away from the keys held in the magazine. At least one of the apertures in the first and second sheets 212, 214 may be elongate (e.g. discorectangular shaped) to allow the position of the back plate 230 relative to the first and second sheets 212, 214 to be adjusted.

The back plate 230 and the guide plates 220, 222 are configured to retain the cylinder key blanks in the required alignment, such that they arrive at the key blank dispenser 30 in the correct position. The plates 220, 222 may be adjusted as required for different sizes and shapes of cylinder key blanks.

A slot 240 is provided at the base of the magazine 200 to enable a single key blank 500 to pass laterally therethrough. A mount 250 is provided for mounting the magazine 200 to the machine frame (not shown).

A magazine 26 for storing a number of lever key blanks is shown for instance in FIGS. 36-40, and the magazine 300 of FIGS. 36-40 will be referred to as a lever key magazine 300 hereafter.

Figure 36:
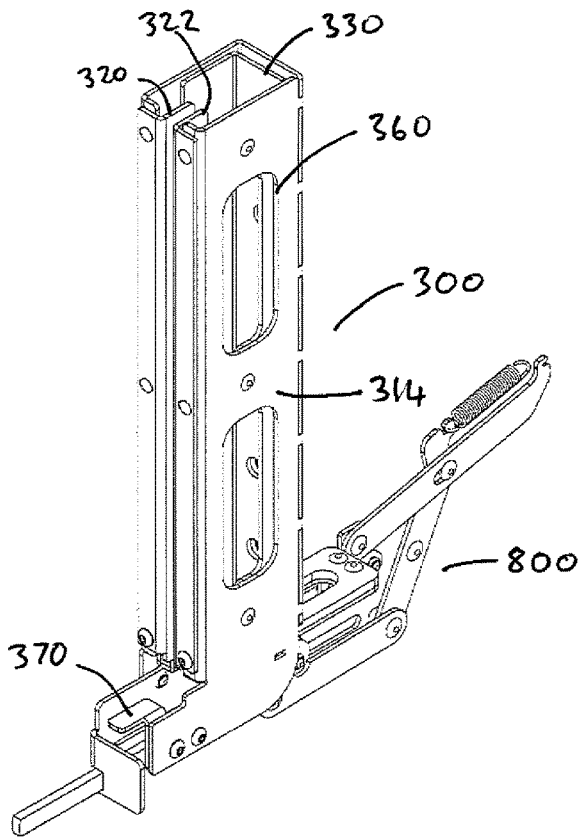
FIG. 36 is a diagrammatic perspective view of a dispenser and a magazine for lever key blanks, which forms part of a key cutting apparatus according to the disclosure.
Figure 37:
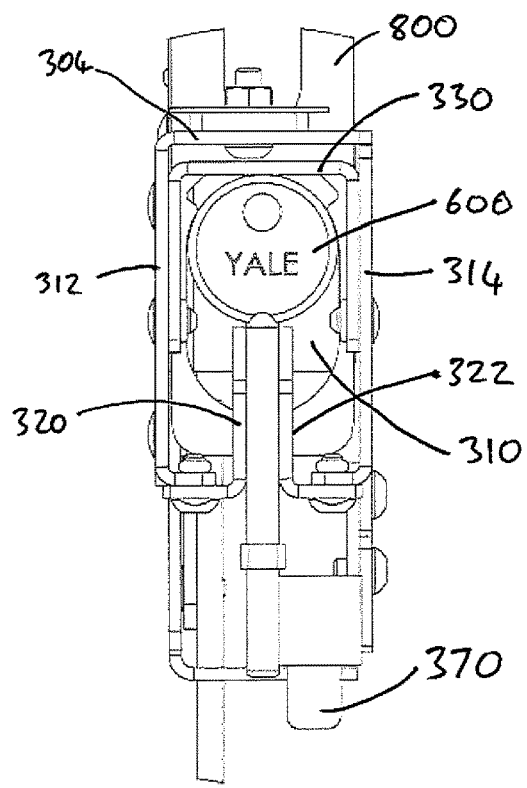
FIG. 37 is a plan view of the dispenser and magazine of FIG. 36.
Figures 38, 39:
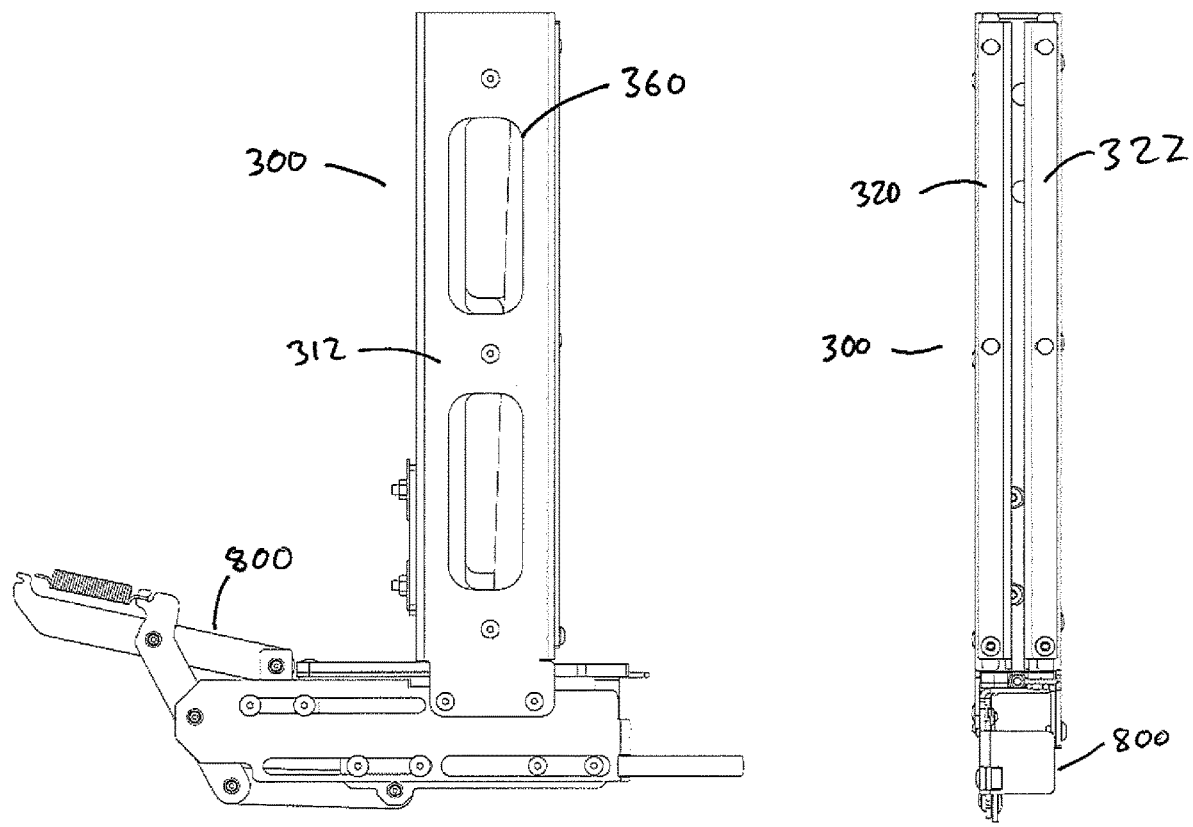
FIG. 38 is a side view of the dispenser and magazine of FIG. 36.
FIG. 39 is a front view of the dispenser and magazine of FIG. 36.
Figure 40:
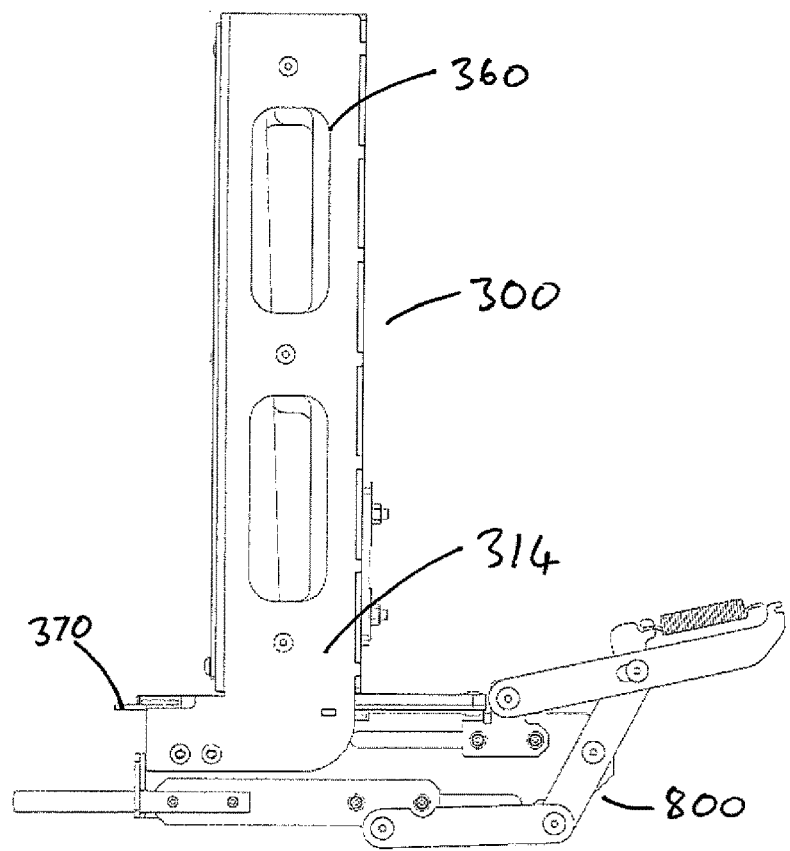
FIG. 40 is a further side view of the dispenser and magazine of FIG. 36.

The lever key magazine 300 is similar to the cylinder key magazine 200, with some differences. As the lever key blanks 600 do not have an ear 530, the first and second guide plates 320, 322 of the lever key magazine 300 each extend for the same distance into the vertical opening 310, such that the ends of both the guide plates 320, 322 engage against the head 610 of the lever key blanks 600, adjacent to the shank 620. The back piece 330 of the lever key magazine 300 extends further towards the rear end 304 of the lever key magazine 300, to accommodate the lever key blanks 600, which are generally longer than cylinder key blanks 500. As can be seen in FIGS. 36, 38 and 40, the first and second sheets 312, 314 of the lever key magazine 300 include cut out sections 360 to provide a weight saving.

A blade shelf 370 is provided at the lower end of the lever key magazine 300. The blade shelf 370 provides support for the blade 640 of the lowermost lever key blank 600 in the magazine 300, to prevent the lowermost key blank 600 from falling out of the magazine 300. The blade shelf 370 is fastened to the second sheet 312, 314 by fasteners such as rivets which extend through apertures in the blade shelf 370 and the second sheet 312, 314.

The blade shelf 370 may be adjustably fastened to the second sheet 314 of the magazine 300, such that the blade shelf 370 can be moved closer to or further away from the keys held in the magazine 300. At least one of the apertures in the second sheet 314 may be elongate (e.g. discorectangular shaped) to allow the position of the blade shelf 370 relative to the second sheet 314 to be adjusted.

Key Blank Dispenser

A first key blank dispenser 700 is shown in FIGS. 31-36, 41-43 and 46-48, which is for dispensing a cylinder key blank 500. A second key blank dispenser 800 shown in FIGS. 36-40 and 49-54 is for dispensing a lever key blank 600.

Figure 41:
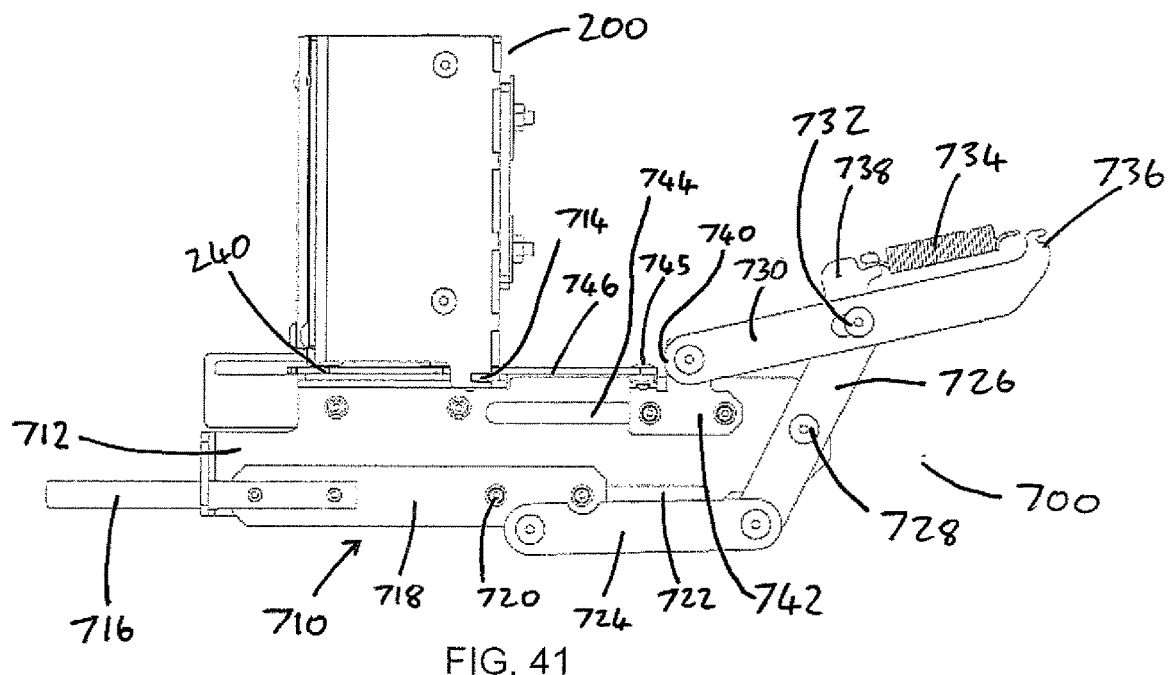
FIG. 41 is an enlarged view of FIG. 35.
Figure 42:
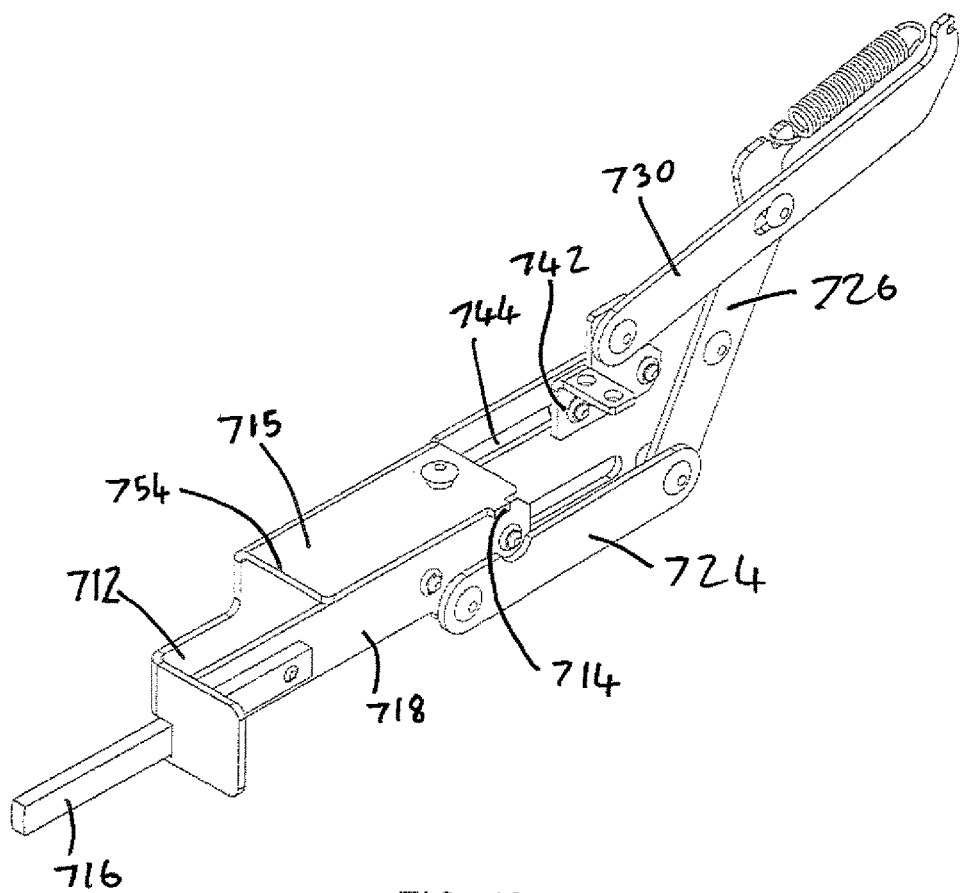
FIG. 42 is a perspective view of the dispenser of FIG. 31, shown without the ejector.
Figure 43:
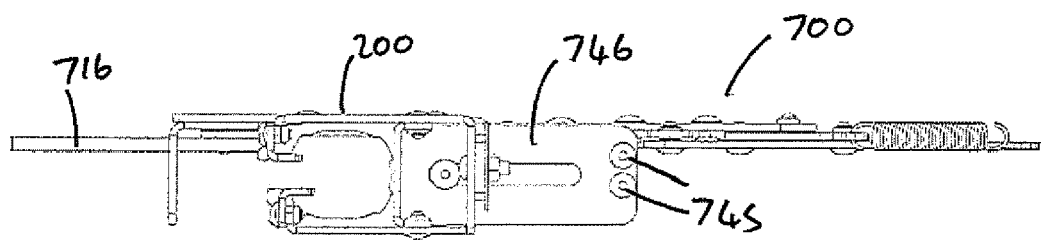
FIG. 43 is a plan view of the dispenser and magazine of FIG. 31.

The first key blank dispenser 700 includes an ejector arrangement 710, shown best in FIGS. 41 and 42, mounted principally beneath, and partially behind the magazine 200. The ejector arrangement 710 includes a frame 712 which includes mounting formations 714 to permit mounting of the magazine 200 by a friction fit with a corresponding slot on the magazine 200. The frame 712 includes a support surface 715 for supporting the stack of keys in the magazine 200. The actuator 32 in the form of a rod 716 extends laterally outwardly from the remainder of the ejector arrangement 710 and also extends outwardly beneath the slot 240.

The rod 716 is mounted on a connector 718 which is slidably movable laterally relative to the frame 712, with guides 720 located in a lateral slot 722. A first link 724 is pivotally mounted to the connector 718 at one end, and pivotally connects at the other end to a second link 726, which second link 726 is pivotally mounted about a generally central point 728 to a rear part of the frame 712.

A third link 730 is pivotally mounted about a generally central point 732 to a far end of the second link 726. A spring 734 extends between a rear end 736 of the third link 730 and an upper part 738 of the second link 726 (the spring is not shown connected to rear end 736 of the third link 730 in the Figures, but would be connected in use), which spring 734 urges the ejector arrangement 710 to the condition shown, with the actuating rod 716 extending fully forwards from the frame 712.

A forward end 740 of the third link 730 is pivotally mounted to a carriage 742 which is movable along a slot 744 in the frame 710. The carriage 742 is also mounted by fasteners, such as rivets 745, to a rear end of an ejector 746, which ejector 746 is slidably movable into the slot 240 to eject a key blank 500 from the stack of key blanks.

Figure 45:
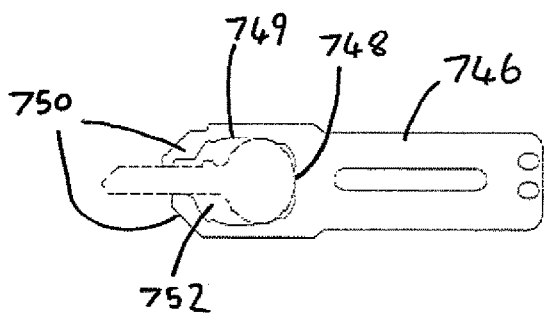
FIG. 45 is a plan view of the ejector of the dispenser of FIG. 31, showing the outline of a cylinder key using a broken line.

The ejector 746, shown best in FIG. 45, is supported by the support surface 715 and is in the form of a plate with a cut out portion 479 for receiving a cylinder key blank 500. The ejector 746 includes a concave engagement face 748 which can engage against the rounded head 510 of a cylinder key blank 500. The ejector further includes two alignment arms 750, each extending from a side of the engagement face 748. The alignment arms 750 are configured to engage against each respective side of the shank 520 of a cylinder key blank 500, to retain the key blank 500 in the required alignment when being ejected.

The alignment arms 750, which extend around the side of the head 510 and to the sides of the shank 520 of a cylinder key blank 500 received therein, prevent the key blank 500 from being removed laterally out of the ejector 746, as the head 510 of the blank 500 cannot pass through the gap between the alignment arms 750. Thus, to enable a key blank 500 to be removed from the ejector 746, the alignment arms 750 are configured to engage against the sides of the shank 520 of the key blank 500 at a point spaced from the head 510 or ear 530 of the key blank 500, when the head 510 of the key blank is in contact with the face 748 of the ejector 746. This provides a forward space 752 for a key blank 500 received in the cut out portion 749 of the ejector 746 to move into. The forward space 752 enables the key blank 500 to move over the edge 754 of the support surface 715. Once the key blank 500 has cleared the edge 754 of the support surface 715, the key blank 500 can then be lowered vertically downwards from the cut out portion 479 of the ejector 746 and away from the dispenser 700.

Figure 46:
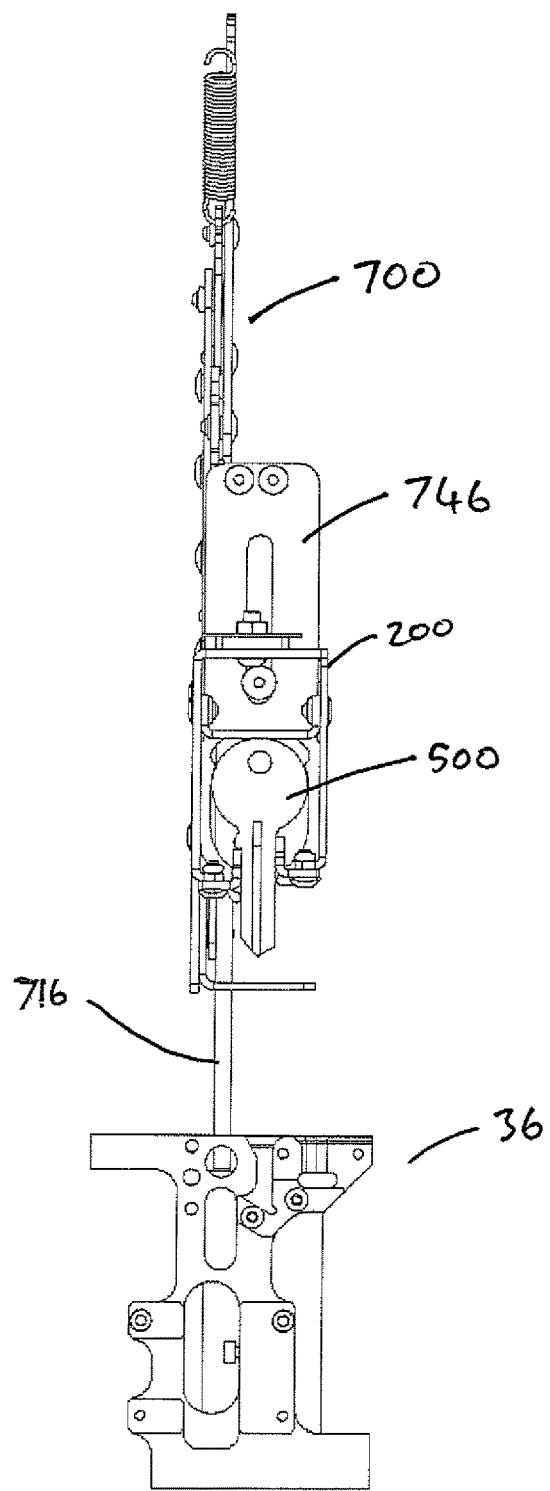
FIG. 46 is a plan view of the dispenser and magazine of FIG. 31 along with part of a carrying arrangement, which form part of a key cutting apparatus according to the disclosure, with the dispenser, the magazine and the part of the carrying arrangement being shown in a first position.
Figure 47:
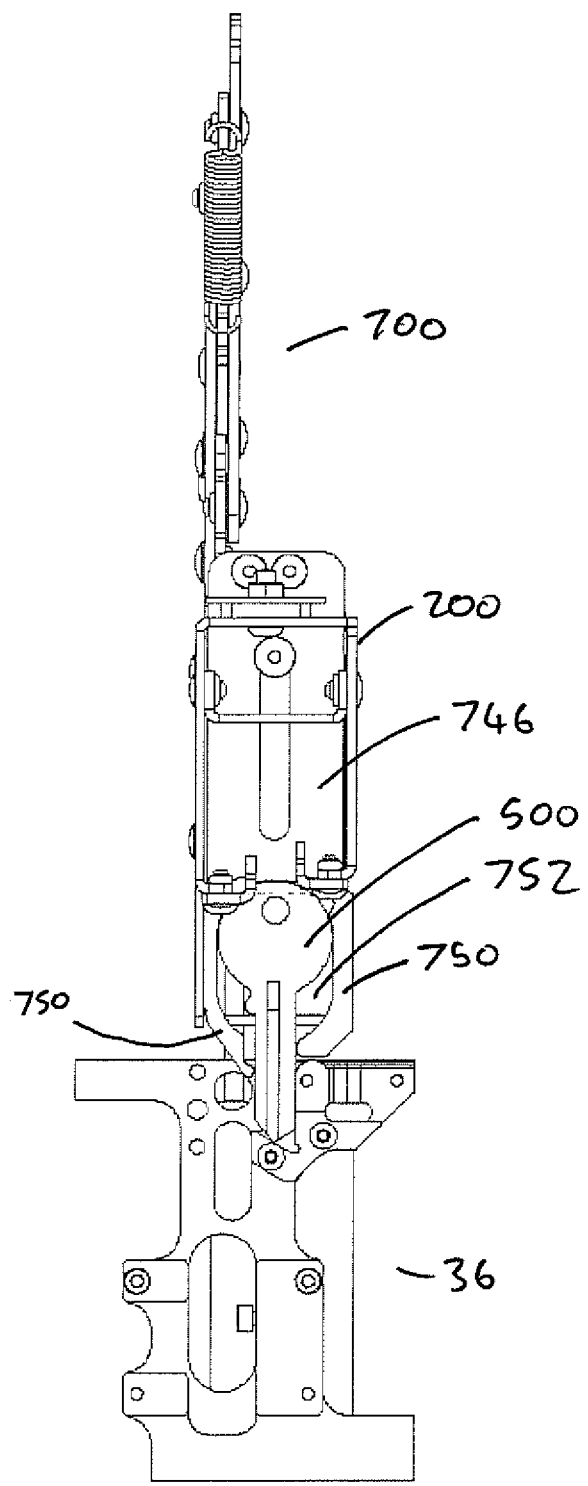
FIG. 47 is a plan view of the dispenser, the magazine and the part of the carrying arrangement of FIG. 46, shown in a second position.

In use, when it is required to dispense a key blank 500, the actuating rod 716 is pushed towards the magazine 200, for instance by the carrying arrangement 36, which via the first, second and third links 724, 726, 730 causes the ejector 746 to move forwards from the first position shown in FIG. 46, urging the lowermost blank 500 from the stack outwardly. As the key blank 500 is urged forwards, it is retained in position by the alignment arms 750 engaging with the shank 520 of the key blank 500.

Figure 48:
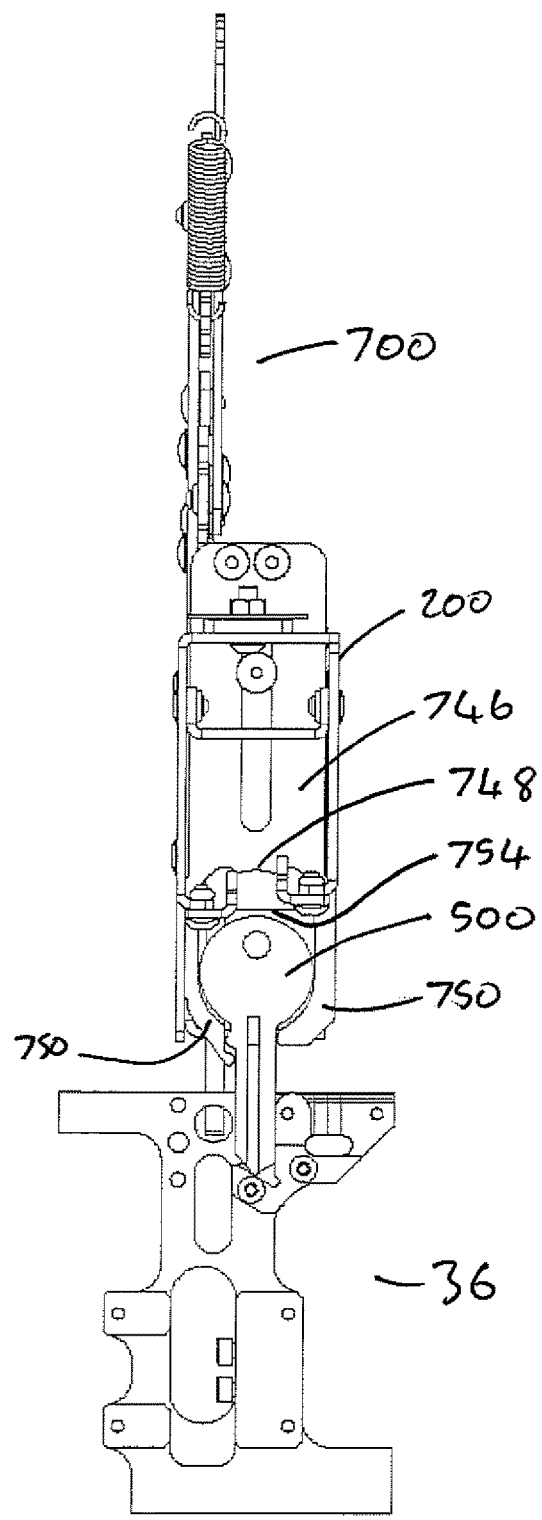
FIG. 48 is a plan view of the dispenser, the magazine and the part of the carrying arrangement of FIG. 46, shown in a third position.

The shank 520 of the key blank 500 is ejected into the carrying assembly 36. In the ejected position, shown in FIG. 47, part of the head 510 of the key blank 500 is supported by the edge 754 of the support surface 715, and the end of the shank 520 is supported by the first clamp plate 124 of the key carrying arrangement 36. The carrying arrangement 36 then clamps onto the shank 520 of the key blank 500, such that the key blank 500 is fully supported by the carrying arrangement 36. Once clamped, the carrying arrangement 36 pulls the key blank laterally away from the face engageable with the head of the key blank into the forward space 752 of the ejector 746, such that the head 520 the key blank 500 is clear of the edge 754 of the support surface 715, which is shown in FIG. 48.

Once clear of the edge 754 of the support surface 715, the key blank 500 can be lowered by the carrying assembly 36, such that it is clear of the ejector 746. The carrying arrangement 36 can then carry the key blank 500 to other parts of the apparatus 10.

Figure 49:
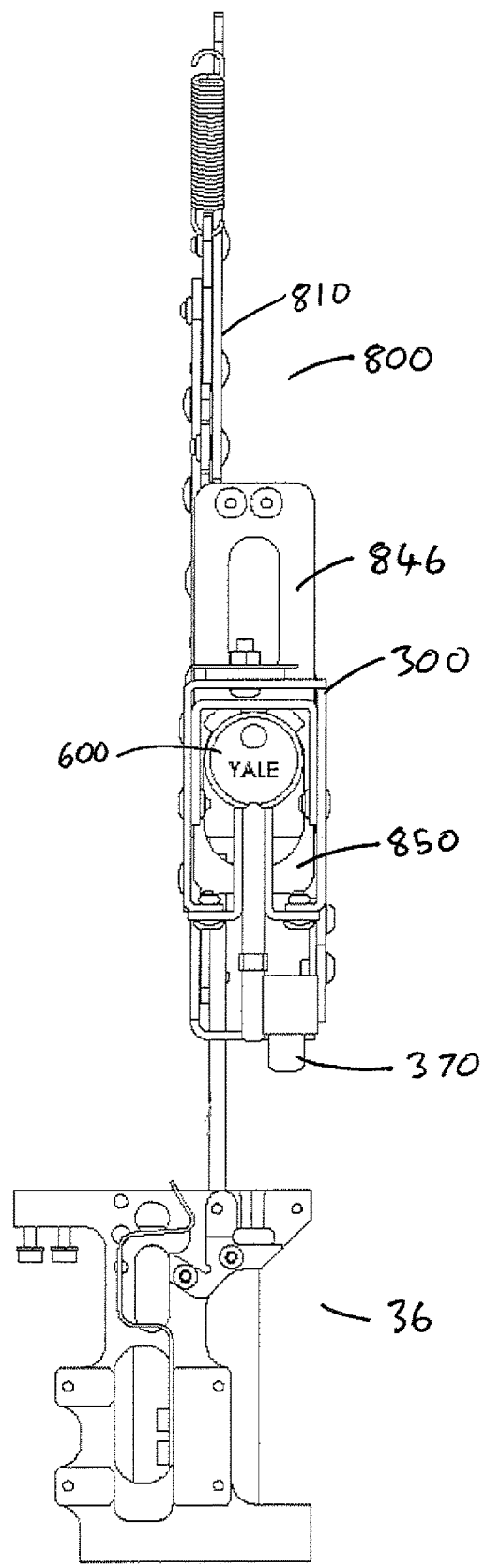
FIG. 49 is a plan view of the dispenser and magazine of FIG. 36 along with part of a carrying arrangement, which form part of a key cutting apparatus according to the disclosure, with the dispenser, the magazine and the part of the carrying arrangement being shown in a first position.
Figure 50:
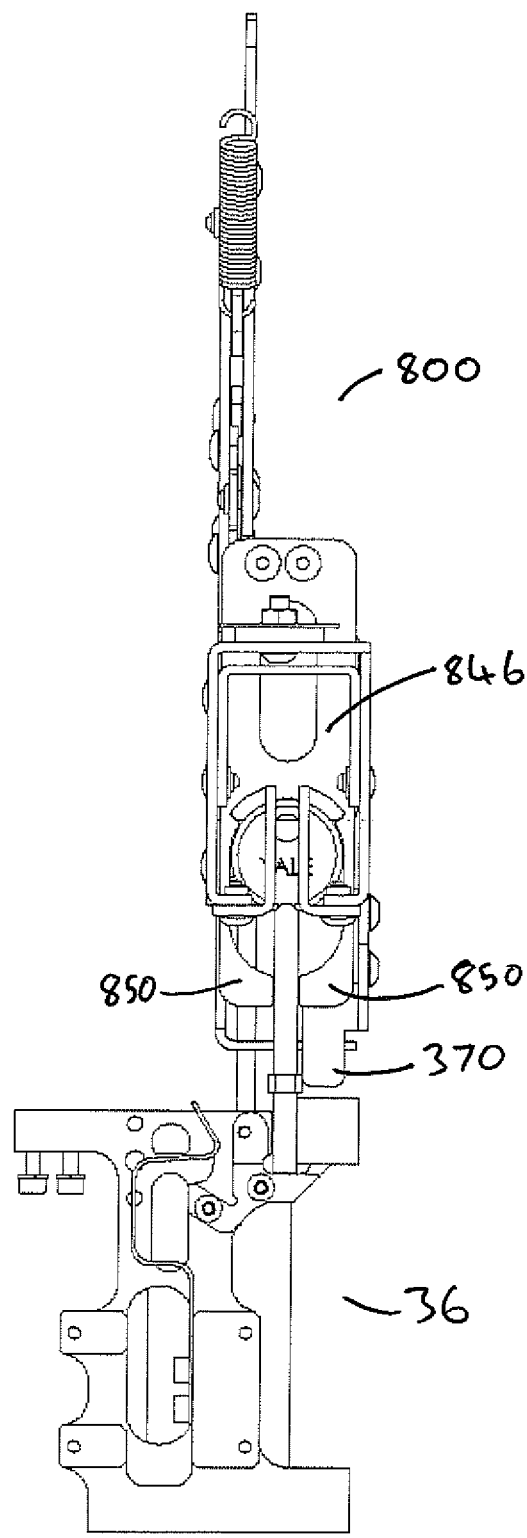
FIG. 50 is a is a plan view of the dispenser, the magazine and the part of the carrying arrangement of FIG. 49, shown in a second position.
Figure 51:
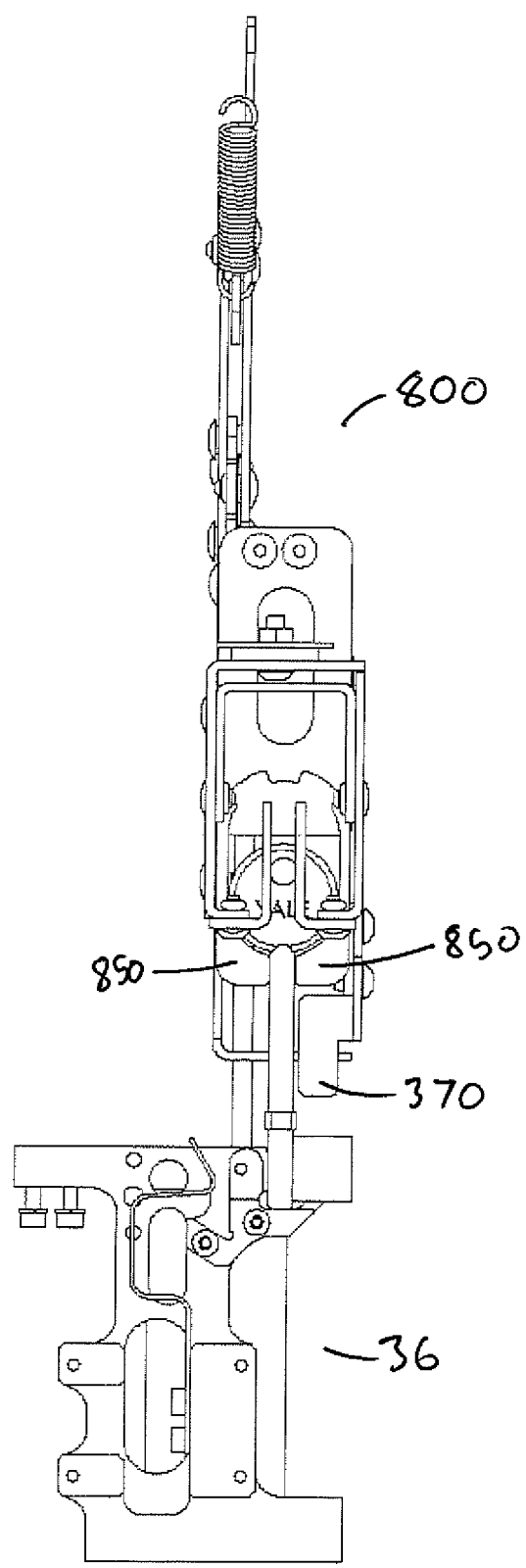
FIG. 51 is a is a plan view of the dispenser, the magazine and the part of the carrying arrangement of FIG. 49, shown in a third position.

FIGS. 49 to 51 show the second key blank dispenser 800 ejecting a lever key blank 600, which has a similar ejector arrangement 810 to the first dispenser 700, but with some differences.

Figure 52:
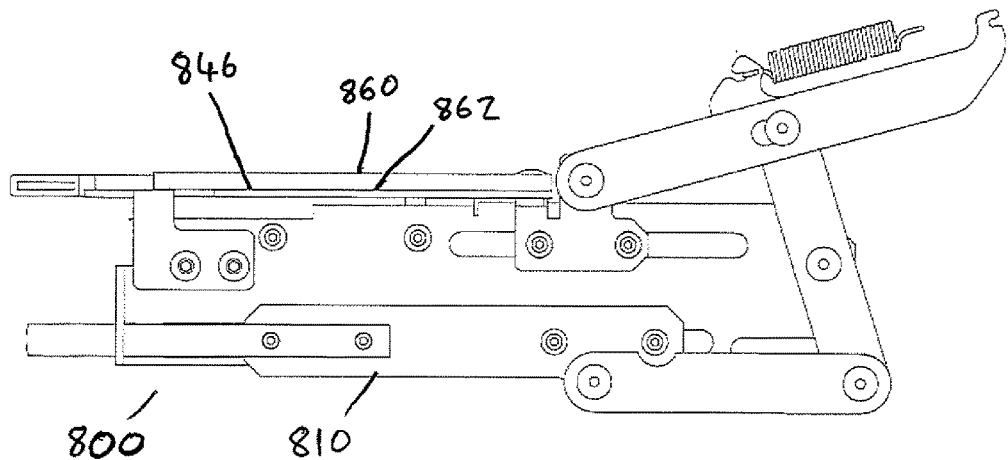
FIG. 52 is a side view of the dispenser of FIG. 36.
Figure 53:
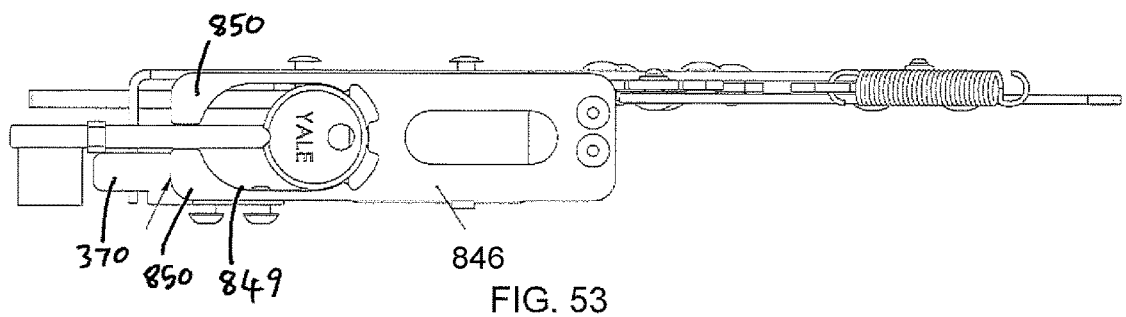
FIG. 53 is a plan view of the dispenser of FIG. 36.
Figure 54:
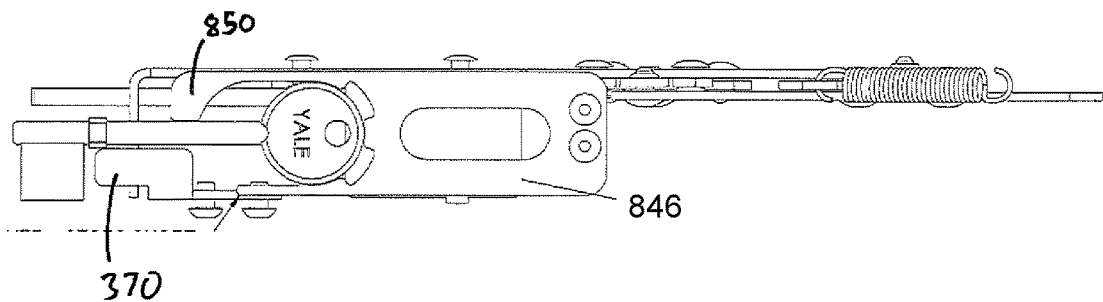
FIG. 54 is a plan view of the dispenser of FIG. 36 with the first layer of the ejector removed.

As shown in FIGS. 52-54, the ejector arrangement 810 of the second key blank dispenser 800 includes a double layer ejector 846, in the form of two plates with cut out portions 849. The double layer ejector 846 solves the problem of the ejector 846 hitting against the bit shelf 370 of the lever key magazine 300. The upper first layer 860 shown in FIG. 53 includes both alignment arms 850 and is configured to move over the bit shelf 370 and retain the key blank 600 in the required alignment when the key blank is being ejected. The second lower layer 862 shown in FIG. 54 (with the first layer 860 not shown) is configured to sit underneath and support the first layer 860, but does not include an alignment arm 850 on the same side of the blank dispenser 800 as the bit shelf 370, such that the ejector 846 does not hit against the bit shelf 370.

There is thus described a key cutting apparatus which provides for automatic copying of a key. Following reading of a key shape and type, an appropriate key blank type is automatically chosen, cut and delivered to an outlet. The apparatus permits a wide range of different key blanks to be stored and hence a wide range of different keys to be copied.

Various modifications may be made without departing from the scope of the invention. The cabinet may be differently arranged, and may not include a frame, or at least a frame of the type shown. A different arrangement of magazines or types of magazines can be used. The key carrying arrangement may take a different form and could carry the blanks differently. A different key cutting arrangement could be used.

As indicated a different number of magazines may be provided, and these may be arranged differently, as required.

The magazines may hold the blanks in a different manner. A different scanning camera arrangement could be used.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The invention claimed is:

1. Key cutting apparatus for cutting a new key to replicate an existing key, the apparatus comprising:
    an optical reader to read a shape of the existing key, the reader determining a type of key blank to be cut and a required shape for the blank to be cut to;
    a blank storage arrangement for retaining a supply of a number of different types of key blanks, the blank storage arrangement including:
        a plurality of magazines configured to receive a plurality of key blanks stacked in substantially identical alignment, with a respective magazine for respective types of key blank, the magazines including a slot to enable a single key blank to be ejected from the stack of key blanks; and
        a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, the key cutting apparatus further comprising:
    a key cutter configured to cut a new key from a blank ejected by and obtained from the at least one of the plurality of dispensers in accordance with a determined required shape of the existing key; and
    a key carrying arrangement configured to fetch a required key blank from the blank storage arrangement, configured to take the required key blank to the key cutter, and configured to deliver the cut key from the key cutter to an outlet to deliver a new key to a customer.

2. Key cutting apparatus according to claim 1, in which the dispensers are configured to automatically eject a key blank upon the key carrying arrangement arriving at the respective magazine.

3. Key cutting apparatus according to claim 2, in which the dispenser includes a linkage with an actuator for engagement by the key carrying arrangement, which actuator when engaged by the key carrying arrangement for the single key blank causes the ejector to move to eject the key blank.

4. Key cutting apparatus according to claim 1, in which the arms of the ejector are configured to engage against the sides of the shank of the key blank at a point spaced from the head or an ear of the key blank, when the head of the key blank is in contact with the face of the ejector, to provide a forward space for the head of the key blank.

5. Key cutting apparatus according to claim 1, in which the key blanks are stacked vertically one above another in substantially identical alignment, and the single key blank is a lowermost key blank from a stack of key blanks, wherein the dispenser includes a surface configured to support the lowermost key blank from the stack of key blanks and the ejector.

6. Key cutting apparatus according to claim 5, in which the ejector is slidably movable through the slot up to a forward ejected position where a whole of the face that is engaged with the head of a key blank does not move beyond an edge of the support surface, such that at least a part of the head of the key blank received in the ejector being moved by the ejector is supported by the edge of the support surface in the ejected position, and the key carrying arrangement is positionable to receive an end of the shank of an ejected key, such that at least a part of the shank of an ejected key is supported by the key carrying arrangement in the ejected position.

7. Key cutting apparatus according to claim 6, in which the key carrying arrangement is configured to clamp onto the key in the ejected position.

8. Key cutting apparatus according to claim 7, in which the key carrying arrangement is configured to pull the clamped key laterally away from the face engageable with the head of the key blank such that the key blank is clear of the support surface, and then lower the key blank such that it is clear of the arms of the ejector.

9. Key cutting apparatus according to claim 1, in which the face engageable with the head of the key blank is concave.

10. Key cutting apparatus according to claim 1, in which the dispenser is spring urged to a position where the ejector is not ejecting a key blank from the magazine.

11. Key cutting apparatus according to claim 1, in which the magazines have an internal profile to engage with the head and shank of a key blank to provide a correct alignment thereof.

12. Key cutting apparatus according to claim 11, in which the internal profile of the magazine is adjustable to receive different sizes and shapes of key blanks.

13. Key cutting apparatus according to claim 1, in which the key carrying arrangement includes a key clamp assembly, the assembly including first and second clamp plates selectively movable together or apart to selectively clamp a key blank therebetween, the assembly including a lever key clamp arrangement and a cylinder key clamping arrangement for selectively respectively either clamping a lever key blank or a cylinder key blank in a required position on the assembly.

14. Key cutting apparatus according to claim 13, in which the required positions for respectively clamping either a lever key blank or a cylinder key blank are different from each other.

15. Key cutting apparatus according to claim 14, in which the lever key blank clamping arrangement and the cylinder key clamping arrangement are located adjacent each other.

16. Key cutting apparatus according to claim 1, in which at least ten magazines are provided.

17. Key cutting apparatus according to claim 1, in which the key carrying arrangement holds the shank of an ejected key blank and delivers the key blank to the key cutter such that the key blank is held in the key cutter by the head of the key blank.

18. Key cutting apparatus for cutting a new key to replicate an existing key, the apparatus comprising:
    reading means for reading a shape of the existing key, the reading means determining a type of key blank to be cut and a required shape for the blank to be cut to;
    blank storage means for retaining a supply of a number of different types of key blanks, the blank storage means including:
        a plurality of magazines configured to receive a plurality of key blanks in substantially identical alignment, with a respective magazine for respective types of key blank, the magazines including a slot to enable a single key blank to be ejected from the stack of key blanks; and a plurality of dispensing means for the plurality of magazines configured to eject key blanks from the magazines, at least one of the plurality of dispensing means including ejecting means which is slidably movable in the slot to engage with and move the single key blank, wherein the ejecting means includes a face engageable with a head of a key blank and two arms engageable with sides of a shank of the key blank, the key cutting apparatus further comprising:

key cutting means configured to cut a new key from a blank ejected by and obtained from the at least one of the plurality of dispensing means in accordance with a determined required shape of the existing key; and carrying means, the carrying means being configured to fetch a required key blank from the blank storage means, configured to take the required key blank to the key cutting means, and configured to deliver the cut key from the key cutting means to an outlet to deliver a new key to a customer.

19. Key cutting apparatus for cutting a new key to replicate an existing key, the apparatus comprising:

an optical reader to read a shape of the existing key, the reader determining a type of key blank to be cut and a required shape for the blank to be cut to;

a blank storage arrangement for retaining a supply of a number of different types of key blanks, the blank storage arrangement including:

a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, the key cutting apparatus further comprising:

a key cutter configured to cut a new key from a blank ejected by and obtained from the at least one of the plurality of dispensers in accordance with a determined required shape of the existing key; and a key carrying arrangement configured to fetch a required key blank from the blank storage arrangement, and configured to take the required key blank to the key cutter, wherein the plurality of dispensers are configured to automatically eject a key blank upon the key carrying arrangement arriving at the respective magazine, and wherein the at least one of the plurality of dispensers includes a linkage with an actuator for engagement by the key carrying arrangement, which the actuator when engaged by the key carrying arrangement for the single key blank causes the ejector to move to eject the key blank.

20. Key cutting apparatus for cutting a new key to replicate an existing key, the apparatus comprising:

an optical reader to read a shape of the existing key, the reader determining a type of key blank to be cut and a required shape for the blank to be cut to;

a blank storage arrangement for retaining a supply of a number of different types of key blanks, the blank storage arrangement including:

a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, wherein the two arms of the ejector are configured to engage against the sides of the shank of the key blank at a point spaced from the head or an ear of the key blank, when the head of the key blank is in contact with the face of the ejector, to provide a forward space for the head of the key blank, the key cutting apparatus further comprising:

a key cutter configured to cut a new key from a blank ejected by and obtained from the at least one of the plurality of dispensers in accordance with a determined required shape of the existing key.

21. Key cutting apparatus for cutting a new key to replicate an existing key, the apparatus comprising:

an optical reader to read a shape of the existing key, the reader determining a type of key blank to be cut and a required shape for the blank to be cut to;

a blank storage arrangement for retaining a supply of a number of different types of key blanks, the blank storage arrangement including:

a plurality of magazines configured to receive a plurality of key blanks stacked vertically one above another in substantially identical alignment, with a respective magazine for respective types of key blank, the magazines including a slot to enable a single key blank to be ejected from the stack of key blanks in which the single key blank is a lowermost key blank from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, wherein the at least one of the plurality of dispensers includes a surface configured to support the lowermost key blank from the stack of key blanks and the ejector, and wherein the ejector is slidably movable through the slot up to a forward ejected position where a whole of the face that is engaged with the head of a key blank does not move beyond an edge of the support surface, such that at least a part of the head of the key blank received in the ejector being moved by the ejector is supported by the edge of the support surface in the ejected position, and a key carrying arrangement is positionable to receive an end of the shank of an ejected key, such that at least a part of the shank of an ejected key is supported by the key carrying arrangement in the ejected position, the key cutting apparatus further comprising:

a key cutter configured to cut a new key from a blank ejected by and obtained from the at least one of the plurality of dispensers in accordance with a determined required shape of the existing key.

22. Key cutting apparatus for cutting a new key to replicate an existing key, the apparatus comprising:

an optical reader to read a shape of the existing key, the reader determining a type of key blank to be cut and a required shape for the blank to be cut to;

a blank storage arrangement for retaining a supply of a number of different types of key blanks, the blank storage arrangement including:

a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, the key cutting apparatus further comprising:

a key cutter configured to cut a new key from a blank ejected by and obtained from the at least one of the plurality of dispensers in accordance with a determined required shape of the existing key; and a key carrying arrangement configured to fetch a required key blank from the blank storage arrangement, and configured to take the required key blank to the key cutter, wherein the key carrying arrangement includes a key clamp assembly, the key clamp assembly including first and second clamp plates selectively movable together or apart to selectively clamp a key blank therebetween, and the key clamp assembly including a lever key clamp arrangement and a cylinder key clamping arrangement for selectively respectively either clamping a lever key blank or a cylinder key blank in a required position on the assembly, wherein the required positions for respectively clamping either a lever key blank or a cylinder key blank are different from each other.

23. Key cutting apparatus for cutting a new key to replicate an existing key, the apparatus comprising:

an optical reader to read a shape of the existing key, the reader determining a type of key blank to be cut and a required shape for the blank to be cut to;

a blank storage arrangement for retaining a supply of a number of different types of key blanks, the blank storage arrangement including:

a plurality of magazines configured to receive a plurality of key blanks stacked in substantially identical alignment, with a respective magazine for respective types of key blank, the magazines including a slot to enable a single key blank to be ejected from the stack of key blanks; and a plurality of dispensers for the plurality of magazines configured to eject key blanks from the magazines, at least one of the plurality of dispensers including an ejector which is slidably movable in the slot to engage with and move the single key blank, wherein the ejector includes a face engageable with a head of a key blank and two arms engageable with sides of a shank of the key blank, the key cutting apparatus further comprising:

a key cutter configured to cut a new key from a blank ejected by and obtained from the at least one of the plurality of dispensers in accordance with a determined required shape of the existing key; and a key carrying arrangement configured to fetch a required key blank from the blank storage arrangement, configured to take the required key blank to the key cutter, and configured to hold the shank of an ejected key blank and deliver the key blank to the key cutter such that the key blank is held in the key cutter by the head of the key blank.

* * * * *